(12) United States Patent
Isenburg

(10) Patent No.: US 6,982,715 B2
(45) Date of Patent: Jan. 3, 2006

(54) MESH COMPRESSION PROCESS

(75) Inventor: Martin Isenburg, Chapel Hill, NC (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 10/206,808

(22) Filed: Jul. 26, 2002

(65) Prior Publication Data

US 2004/0017368 A1 Jan. 29, 2004

(51) Int. Cl.
*G06T 17/00* (2006.01)

(52) U.S. Cl. .................. 345/428; 345/581; 345/582; 345/583; 382/243

(58) Field of Classification Search ............. 345/419, 345/428, 581, 582, 583; 382/243
See application file for complete search history.

(56) References Cited

U.S. PATENT DOCUMENTS

| | | | |
|---|---|---|---|
| 4,600,919 A | 7/1986 | Stern | 340/725 |
| 4,747,052 A | 5/1988 | Hishinuma et al. | |
| 4,835,712 A | 5/1989 | Drebin et al. | |
| 4,855,934 A | 8/1989 | Robinson | |
| 4,901,064 A | 2/1990 | Deering | |
| 5,124,914 A | 6/1992 | Grangeat | 364/413.16 |
| 5,163,126 A | 11/1992 | Einkauf et al. | 395/123 |
| 5,371,778 A | 12/1994 | Yanof et al. | |
| 5,611,030 A | 3/1997 | Stokes | |
| 5,731,819 A | 3/1998 | Gagné et al. | 345/433 |
| 5,757,321 A | 5/1998 | Billyard | |
| 5,786,822 A | 7/1998 | Sakaibara et al. | |
| 5,805,782 A | 9/1998 | Foran | |
| 5,809,219 A | 9/1998 | Pearce et al. | |
| 5,812,141 A | 9/1998 | Kamen et al. | |

(Continued)

OTHER PUBLICATIONS

Alliez, P. and M. Desbrun. "Progressive Encoding for Lossless Transmission of 3D Meshes." To appear in *SIG-GRAPH '01 Conference Proceedings*.

Bajaj et al. "Progressive Compression and Transmission of Arbitrary Triangular Meshes." *Visualization '99 Conference Proceedings*, pp. 307–316, 1999.

(Continued)

*Primary Examiner*—Kimbinh T. Nguyen
(74) *Attorney, Agent, or Firm*—Fish & Richardson P.C.

(57) ABSTRACT

A process for encoding an update of a polygon mesh having at least one target vertex includes defining a local index of a vertex that neighbors the target vertex, storing a global index of the target vertex, storing a number of new faces resulting from the update, storing an identity of a face of the mesh using the local index, and storing a movement status of a corner of a polygon adjacent to the target vertex.

41 Claims, 42 Drawing Sheets

U.S. PATENT DOCUMENTS

| | | | |
|---|---|---|---|
| 5,847,712 A | 12/1998 | Salesin et al. | |
| 5,894,308 A | 4/1999 | Isaacs | |
| 5,929,860 A | 7/1999 | Hoppe | |
| 5,933,148 A | 8/1999 | Oka et al. | |
| 5,949,969 A | 9/1999 | Suzuoki et al. | |
| 5,966,133 A | 10/1999 | Hoppe | |
| 5,966,134 A | 10/1999 | Arias | |
| 5,974,423 A | 10/1999 | Margolin | |
| 6,046,744 A * | 4/2000 | Hoppe | 345/419 |
| 6,054,999 A | 4/2000 | Strandberg | |
| 6,057,859 A | 5/2000 | Handelman et al. | 345/474 |
| 6,078,331 A | 6/2000 | Pulli et al. | |
| 6,115,050 A | 9/2000 | Landau et al. | |
| 6,175,655 B1 | 1/2001 | George et al. | |
| 6,191,787 B1 | 2/2001 | Lu et al. | |
| 6,191,796 B1 | 2/2001 | Tarr | |
| 6,198,486 B1 | 3/2001 | Junkins et al. | |
| 6,201,549 B1 | 3/2001 | Bronskill | |
| 6,208,347 B1 | 3/2001 | Migdal et al. | 345/419 |
| 6,219,070 B1 | 4/2001 | Baker et al. | |
| 6,239,808 B1 | 5/2001 | Kirk et al. | |
| 6,252,608 B1 | 6/2001 | Snyder et al. | |
| 6,262,737 B1 | 7/2001 | Li et al. | |
| 6,262,739 B1 | 7/2001 | Migdal et al. | |
| 6,292,192 B1 | 9/2001 | Moreton | |
| 6,317,125 B1 | 11/2001 | Persson | |
| 6,337,880 B1 | 1/2002 | Cornog et al. | 375/240.01 |
| 6,388,670 B2 | 5/2002 | Naka et al. | 345/474 |
| 6,405,071 B1 | 6/2002 | Analoui | |
| 6,437,782 B1 | 8/2002 | Pieragostini et al. | |
| 6,438,266 B1 * | 8/2002 | Bajaj et al. | 382/243 |
| 6,478,680 B1 | 11/2002 | Yoshioka et al. | |
| 6,559,848 B2 | 5/2003 | O'Rourke | |
| 6,593,924 B1 | 7/2003 | Lake et al. | |
| 6,593,927 B2 | 7/2003 | Horowitz et al. | |
| 6,608,627 B1 | 8/2003 | Marshall et al. | |
| 6,608,628 B1 | 8/2003 | Ross et al. | |
| 2001/0026278 A1 | 10/2001 | Arai et al. | |
| 2002/0101421 A1 | 8/2002 | Pallister | |

OTHER PUBLICATIONS

Cohen–Or et al. "Progressive Compression of Arbitrary Triangular Meshes." *Visualization '99 Conference Proceedings*, 67–72, 1999.

Hoppe, H. "Efficient Implementation of Progressive Meshes." *Computers & Graphics*, 22(1), pp. 27–36, 1998.

Hoppe, H. "Progressive meshes." *SIGGRAPH '96 Conference Proceedings*, pp. 99–108, 1996.

Hoppe, H. and J. Popovic. "Progressive simplicial complexes." *SIGGRAPH '97 Conference Proceedings*, pp. 189–198, 1997.

Pajarola et al. "Compressed Progressive Meshes." GVU Center, Georgia Institute of Technology, *Tech Report GIT-GVU*, pp. 99–105, 1999.

Taubin. et al. "Progressive Forest Split Compression." *SIGGRAPH '98 Conference Proceedings*, pp. 123–132, 1998.

Http://www.enbaya.com.

Http://www.ibm.com/hotmedia.

Chow, M., "Optimized Geometry Compression for Realtime Rendering," *Massachusetts Institute of Technology*, pp. 347–354 (1997).

Dyn et al., "A Butterfly Subdivision Scheme for Surface Interpolation with Tension Control," ACM Transactions on Graphics, 9(2), pp. 160–169, Apr. 1990.

Elber, G., "Line Art Rendering Via a Coverage of Isoparametric Curves," *IEEE Transactions on Visualization and Computer Graphics*, 1(3), pp. 231–239, Sep. 1995.

Hoppe, H., "Progressive Meshes," *Microsoft Research*, pp. 99–108, 1996.

Lansdown et al., "Expressive Rendering: A Review of Nonphotorealistic Techniques," *IEEE Computer Graphics and Applications*, pp. 29–37, May 1995.

Lasseter et al., "Principles of Traditional Animation Applied to 3D Computer Animation," *SIGGRAPH '87*, pp. 35–44, Jul. 27–31, 1987.

Lee et al., "Navigating Through Triangle Meshes Implemented as Linear Quadtrees," *ACM Transactions on Graphics*, 19(2), pp. 79–121, Apr. 2000.

Lewis et al., "Pose Space Deformation: A Unified Approach to Shape Interpolation and Skeleton–Driven Deformation," *SIGGRAPH 2000*, pp. 165–172, 2000.

Ma, Kwan–Liu et al., "Extracting Feature Lines from 3D Unstructured Grids," *Institute for Computer Applications in Science and Engineering (ICASE) NASA Langley Research Center, Hampton, Virginia*, pp. 285–292, 1997.

Markosian et al., "Real–Time Nonphotorealistic Rendering," *Brown University Site of the NSF Science and Technology Center for Computer Graphics and Scientific Visulaization, Providence, RI*.

Popović et al., "Progressive Simplicial Complexes," *Carnegie Mellon University*.

Raskar et al., "Image Precision Silhouette Edges," *University of North Carolina at Chapel Hill*, pp. 135–231, 1999.

Samet, H., "Applications of Spatial Data Structures," *Computer Graphics, Image Process, and GIS*, Table of Contents, 9(2), Apr. 1990.

Thomas et al., "The Illusion of Life," *Disney Animation*, pp. 47–71.

Zeleznik et al., "Sketch: An Interface for Sketching 3D Scenes," *Brown University Site of the NSF Science and Technology Center for Computer Graphics and Scientific Visualization* (1996).

Zorin "Interpolation Subdivision for Meshes With Arbitrary Topology" Department of Computer Science, California Institute of Technology, Pasadena, CA.

Appel, Arthur, "The Notion of Quantitative Invisibility and the Machine Rendering of Solids." Proceedings of 22nd National Conference Association for Computing Machinery 1967.

Buck et al., "Performance–Driven Hand Drawn Animation", ACM (NPAR2000), pp. 101—108 (2000).

Catmull et al., "Recursively Generated B–Spline Surfaces on Arbitrary Topological Meshes," Computer Aided Design, 10(6):350—355 (1978).

Coelho et al., "An Algorithm for Intersecting and Trimming Parametric Meshes", ACM SIGGRAPH, pp. 1–8 (1998).

Deering, M., "Geometry Compression," Computer Graphics. SIGGRAPH '95, pp. 13–20, 1995.

DeRose et al., "Subdivisional Surfaces in Character Animation", ACM, SIGGRAPH'98, pp. 85—94 (1998).

Elber, Gershon, "Interactive Line Art Rendering of Freeform Surfaces", Eurographics'99, 18(3):C1—C12 (1999).

Gooch et al., "A Non–Photorealistic Lighting Model for Automatic Technical Illustration," Computer Graphics Proceedings, Annual Conference Series, SIGGRAPH'98, pp. 447–452 (1998).

Gooch et al., "Interactive Technical Illustration," ACM Interactive 3D, pp. 31—38 (1999).

Heidrich et al., "Realistic, Hardware–Accelerated Shading and Lighting," ACM, (SIGGRAPH'99), pp. 171—178 (1999).

Hoppe, H., "View–Dependent Refinement of Progressive Meshes", URL: http://www.research.microsoft.com/hoppe/ (10 pgs).

Kumar et al., "Interactive Display of Large Scale NURBS Models", ACM, Symp. On Interactive 3D Graphics, pp. 51—58 (1995).

Lake et al., "Stylized Rendering Techniques for Scalable Real–Time 3D Animation", NPAR, pp. 101—108 (2000).

Lander, Jeff, "Making Kine More Flexible, "Game Developer Magazine, 5 pgs., Nov. 1998.

Lander, Jeff, "Skin Them Bones," Game Developer Magazine, 4 pgs., May 1998.

pajarola, et al., "Compressed Progressive Meshes" *IEEE Transactions on Visualization and Computer Graphics*, 6(1):79–121 (2000).

Pedersen, "A Framework for Interactive Texturing on Curved Surfaces", ACM, pp. 295—301 (1996).

"PmG Introduces Messiah: Animate 3.0", URL: http://www.digitalproducer.com/aHTM/Articles/Jul._2000/Jul._17_00/pmg_intros_messiah_animate.htm (Accessed Oct. 26, 2004) 2 pgs.

Pueyo, X. et al., "Rendering Techniques '96, "Proc. of Eurographics Rendering Workshop 1996, EUROGRAPHICS, pgs. 61—70 (1996).

"Rockwood, A. et al.,""Real–time Rendering of Trimmed Surfaces," Computer Graphics (SIGGRAPH '89 Proceedings) 23:107—116 (1989).

Sousa, M., et al., "Computer–Generated Graphite Pencil Rendering of 3–D Polygonal Models", Eurographics'99, 18(3):C195—C207 (1999).

Stam, J., "Exact Evaluation of Catmull–Clark Subdivision Surfaces at Arbitrary Parameter Values", SIGGRAPH 98 Conference Proceedings, Annual Conference Series, pp. 395–404 (1998).

Taubin et al., "3D Geometry Compression", SIGGRAPH'98 Course Notes (1998).

Wilhelms, J. & Van Gelder, A., "Anatomically Based Modeling," Univ. California Santa Cruz [online], 1997 [retrieved Dec. 22, 2004], retrieved from the Internet: <URL: http://graphics.stanford.edu/courses/cs448–01–spring/papers/wilhelms.pdf>.

\* cited by examiner

"Predictive" Encoding

For a mesh with n vertices I need to specify n-1 split vertices. That sums Up to a lot of bits:

$$\frac{n}{2} \log_2(n) < \sum_{i=0}^{n-1} \log_2(i) < n \log_2(n)$$

FIG. 28

Adding Texcoords

MESH COMPRESSION PROCESS

TECHNICAL FIELD

This application relates to a process for compressing a progressive representation of a polygonal surface mesh.

BACKGROUND

A multi-resolution mesh (MRM) is a progressive representation of a polygonal surface mesh (optionally textured) that describes a three-dimensional (3D) model. The MRM represents a mesh of v vertices as a sequence of v vertex updates. This representation permits extraction of polygonal meshes with any desired vertex count r, where $3 \leq r \leq v$, in real-time. The MRM is defined by an array of v vertex positions, an optional array of t texture coordinates, and an array of v vertex update records.

An MRM is created by iteratively collapsing one vertex of a polygon into another vertex. Although the two vertices will often be connected by an edge, occasionally also unconnected vertices are collapsed. The collapsed vertex, any unused texture coordinates, and all degenerate polygons are then removed and the texture coordinate indices of the corners of some remaining polygon are changed. Each vertex update record specifies how to undo such a collapse. Undoing such a collapse is also referred to as a vertex split.

Sending an MRM over a bandwidth-limited medium can be difficult, particularly if the MRM has a large number of vertices. This is because of the extensive amount of data that may be required to define the MRM. Compression techniques may be used in order to reduce the amount of data that defines the MRM, thereby making it easier to transmit the MRM over limited-bandwidth media.

There are several different types of information that can be compressed: the array of v vertex positions, the array of t texture coordinates, and the array of v vertex update records. Generally speaking, the largest compression gain can be achieved though a compact and loss-less encoding of the array of v vertex update records.

DESCRIPTION OF THE DRAWINGS

FIG. 28 illustrates the coding costs for specifying split vertices.

Like reference numerals in different figures indicate like elements.

DESCRIPTION

Figure 1:
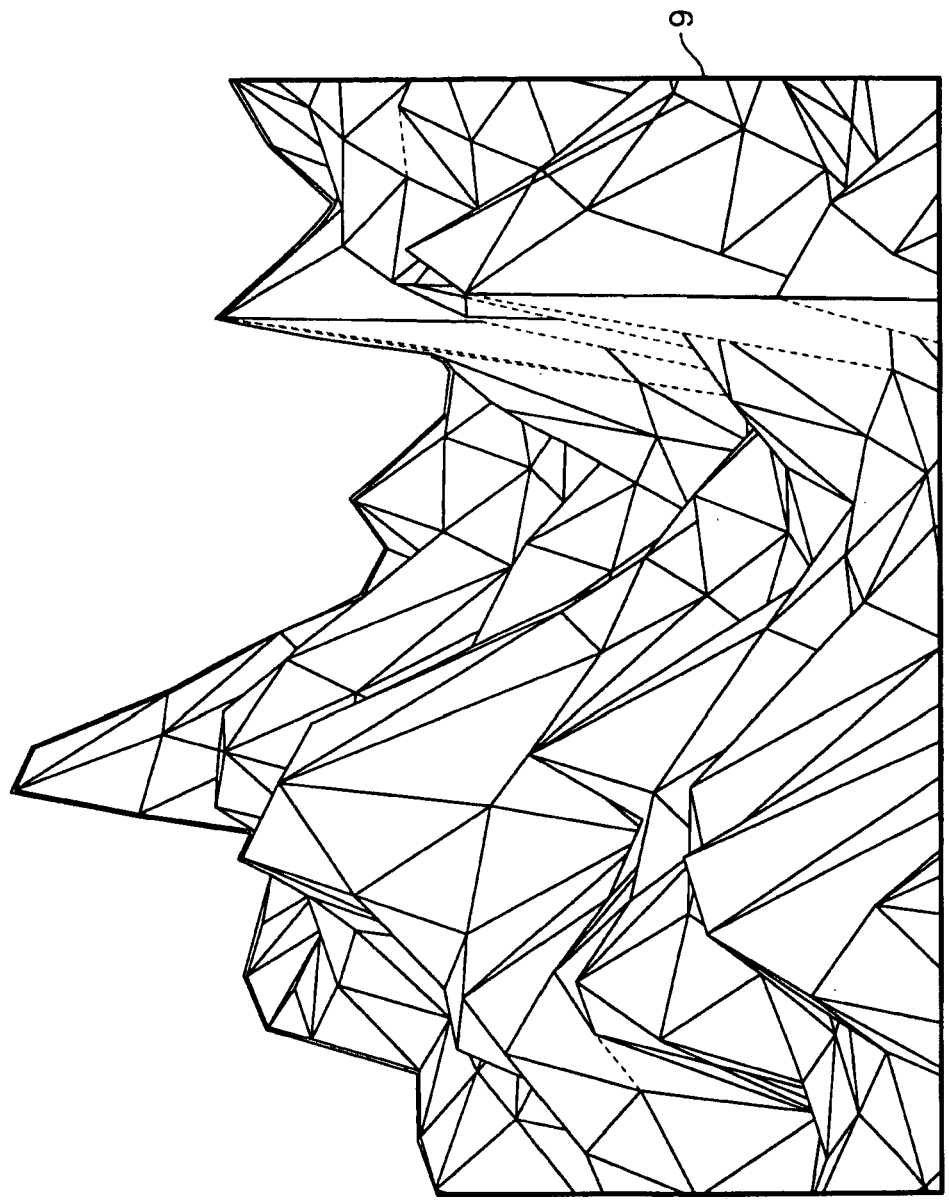
FIG. 1 is a block diagram of an MRM at a low resolution.
Figure 2:
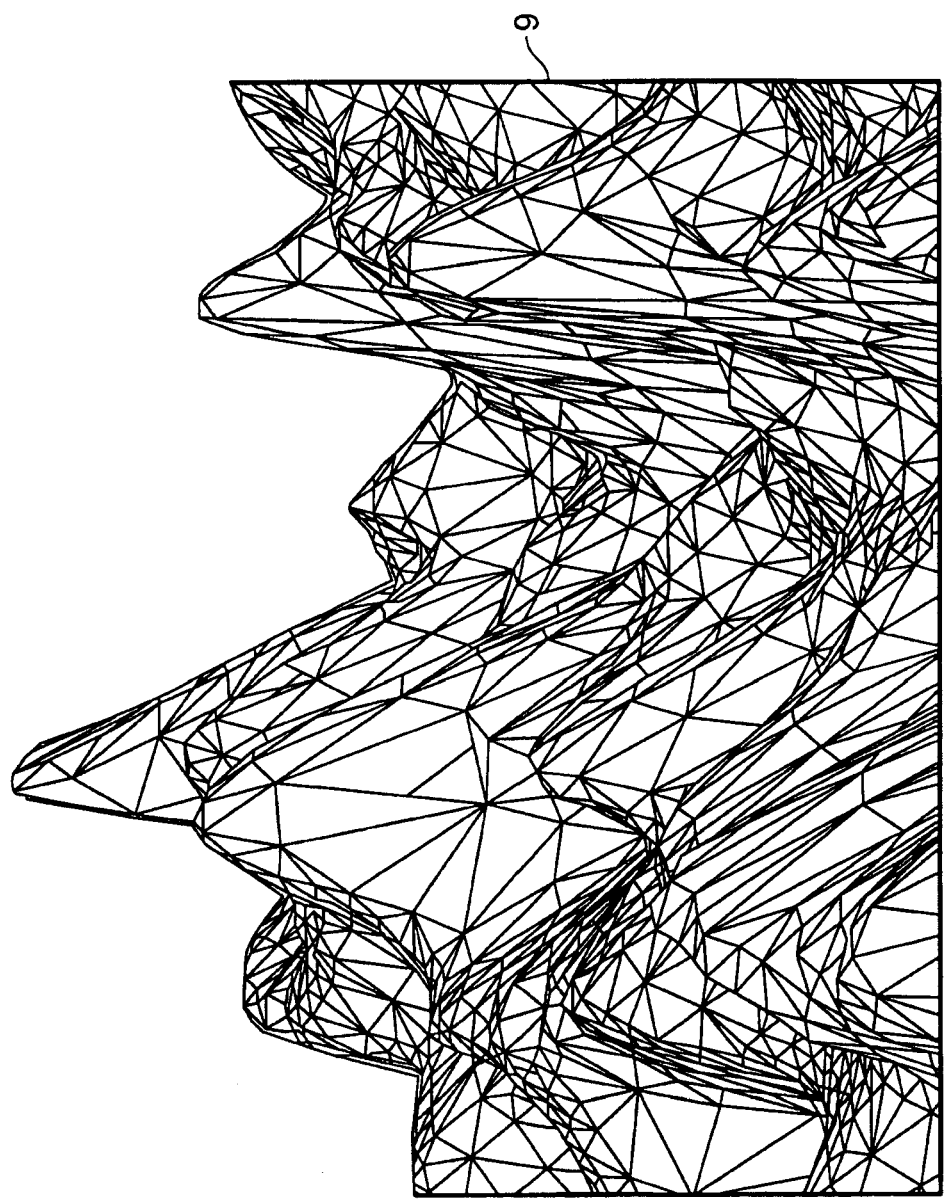
FIG. 2 is a block diagram of the same MRM at a higher resolution.

FIG. 1 shows an MRM at a relatively low resolution. FIG. 2 shows the same MRM at a higher resolution, following a sequence of vertex "updates". Both MRMs are comprised of polygons 9, with the higher resolution MRM of FIG. 2 containing generally smaller polygons that provide a more detailed representation of the surface. A vertex update introduces or removes a vertex of the mesh, which increases or decreases the resolution. For progressive transmission, the encoding process compresses the vertex updates in an increasing order. Hence, in the following text, a vertex update will only be considered in its increasing direction.

Figure 3:
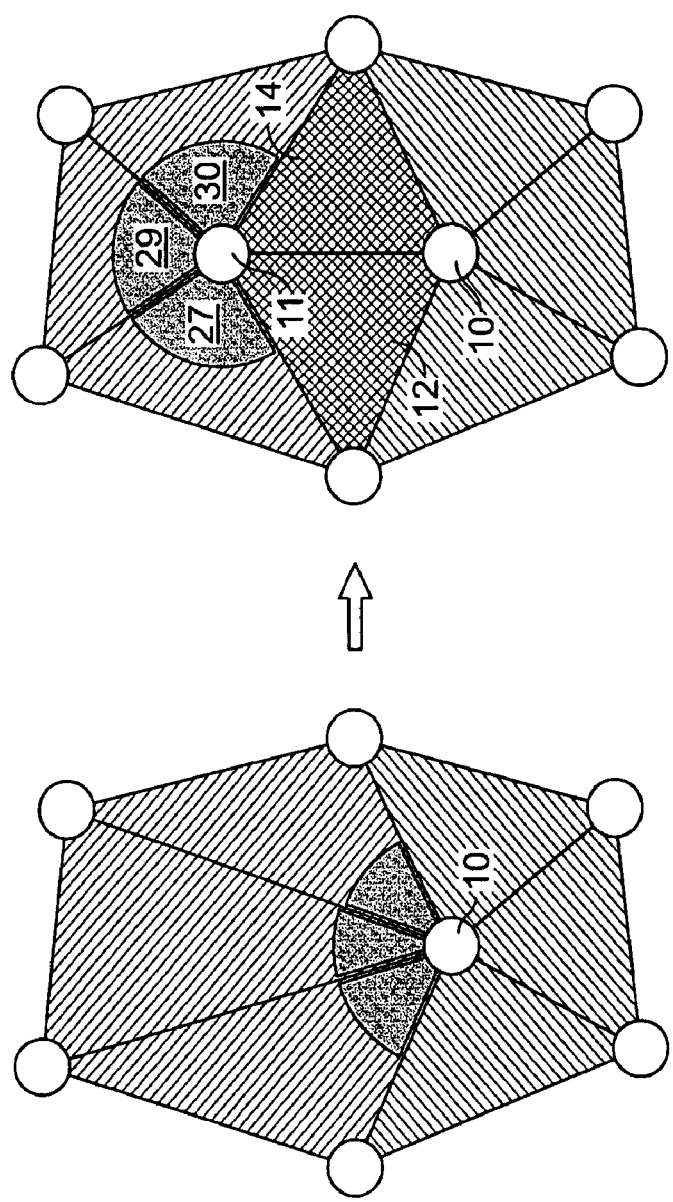
FIG. 3 is a block diagram showing a typical (manifold) MRM vertex update.

An example of a vertex update is shown in FIG. 3. FIG. 3 shows a close-up of the affected part of the mesh and shows only the mesh elements relevant for the vertex update.

As shown in FIG. 3 the mesh is updated in the sense that vertex 11 is introduced. This vertex update introduces two new polygons 12 and 14 and changes the vertex index from 10 to 11 for the corners 27, 29, and 30 of three polygons. This vertex update can be viewed at as "splitting" vertex 10.

An MRM comprised of "N" (N>1) vertices is incrementally constructed by applying "N" vertex updates to increase the resolution of the MRM from its lowest to its highest resolution. In this embodiment, compressing the MRM includes compressing these "N" updates. The compression processes described herein determine the minimal amount of data needed to compress each such vertex update and exploit correlations in the data for common polygon arrangements. Various prediction rules may also be employed to improve compression for less frequently occurring cases.

Figure 4:
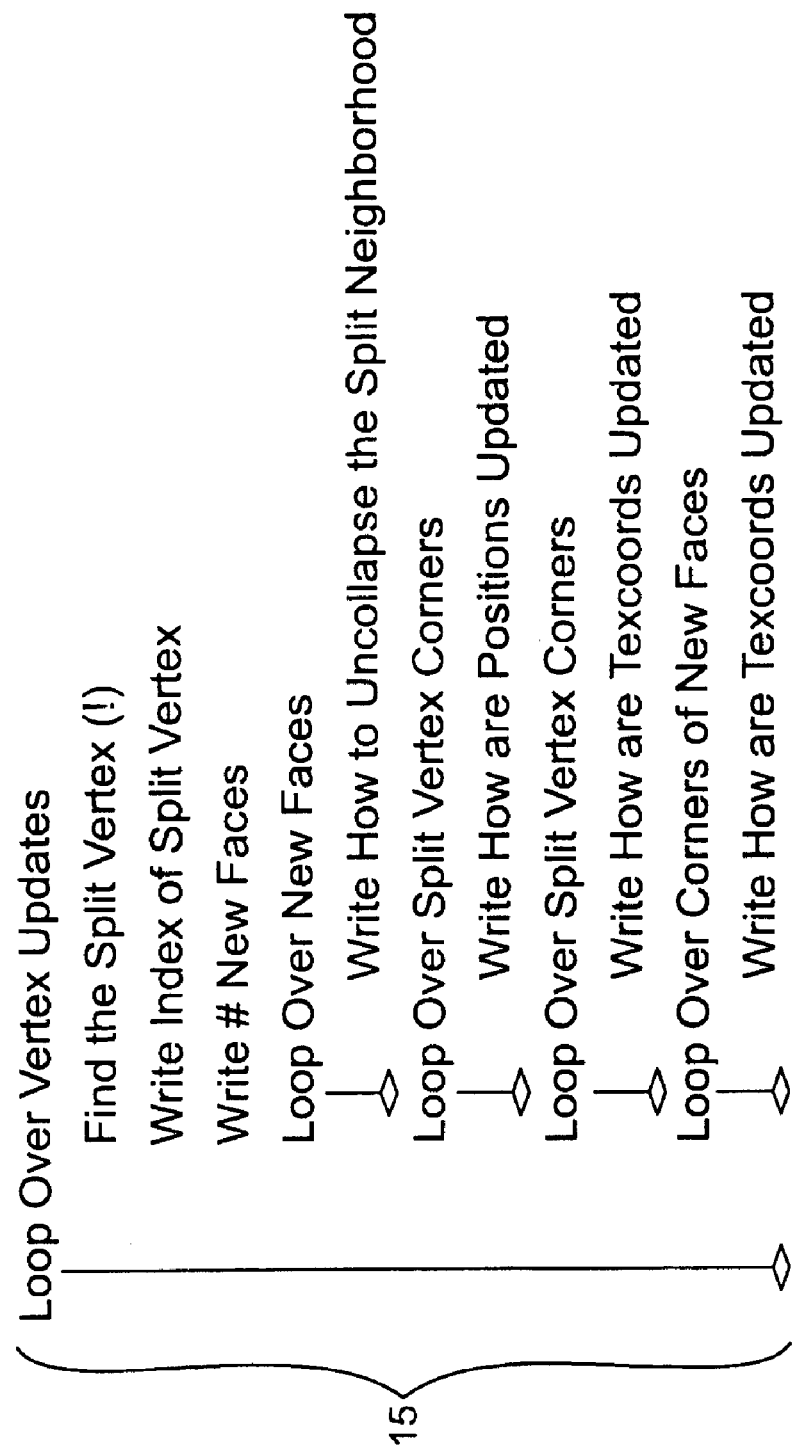
FIG. 4 is a flow diagram showing, conceptually, the operation of the MRM compression techniques described herein.

FIG. 4 shows a general MRM compression process 15. Compression process 15 loops over a sequence of vertex updates to an MRM. After process 15 determines how a vertex update changes an MRM, process 15 provides a concise description of each vertex update that uses the least number of global indices and local indices possible. The main point is that, since process 15 incrementally builds the MRM, each vertex update that increases the resolution of the MRM can be described as a "split" of some vertex in the MRM.

Process 15 finds each split vertex and then describes how the split changes the MRM. For each vertex update, process 15 determines the split vertex and stores the following compression information:

(1) THE INDEX OF THE SPLIT VERTEX
(2) THE NUMBER OF NEW FACES IN THE MRM INTRODUCED BY THE SPLIT
(3) FOR EACH NEW FACE: AN ORIENTATION (LEFT OR RIGHT), AN INDEXING METHOD (LOCAL OR GLOBAL), AND AN INDEX (THIS DATA DESCRIBES HOW TO "UN-COLLAPSE" THE FACE) OF ITS THIRD VERTEX (4) FOR EACH CORNER AROUND THE SPLIT VERTEX: (A) IF ITS VERTEX INDEX IS UPDATED (E.G. IF THE CORNER "MOVES" TO THE UPDATE VERTEX) AND (B) HOW ITS ASSOCIATED TEXTURE INDEX IS AFFECTED IN CASE THE MRM HAS A TEXTURE COORDINATE MAPPING
(5) FOR EACH CORNER AROUND THE UPDATE VERTEX: HOW ITS ASSOCIATED TEXTURE COORDINATE INDEX IS UPDATED IN CASE THE MRM HAS A TEXTURE COORDINATE MAPPING
(6) FOR EACH CORNER OF A NEW FACE: WHAT ITS ASSOCIATED TEXTURE COORDINATE INDEX IS IN CASE THE MRM HAS A TEXTURE COORDINATE MAPPING

Figure 5:
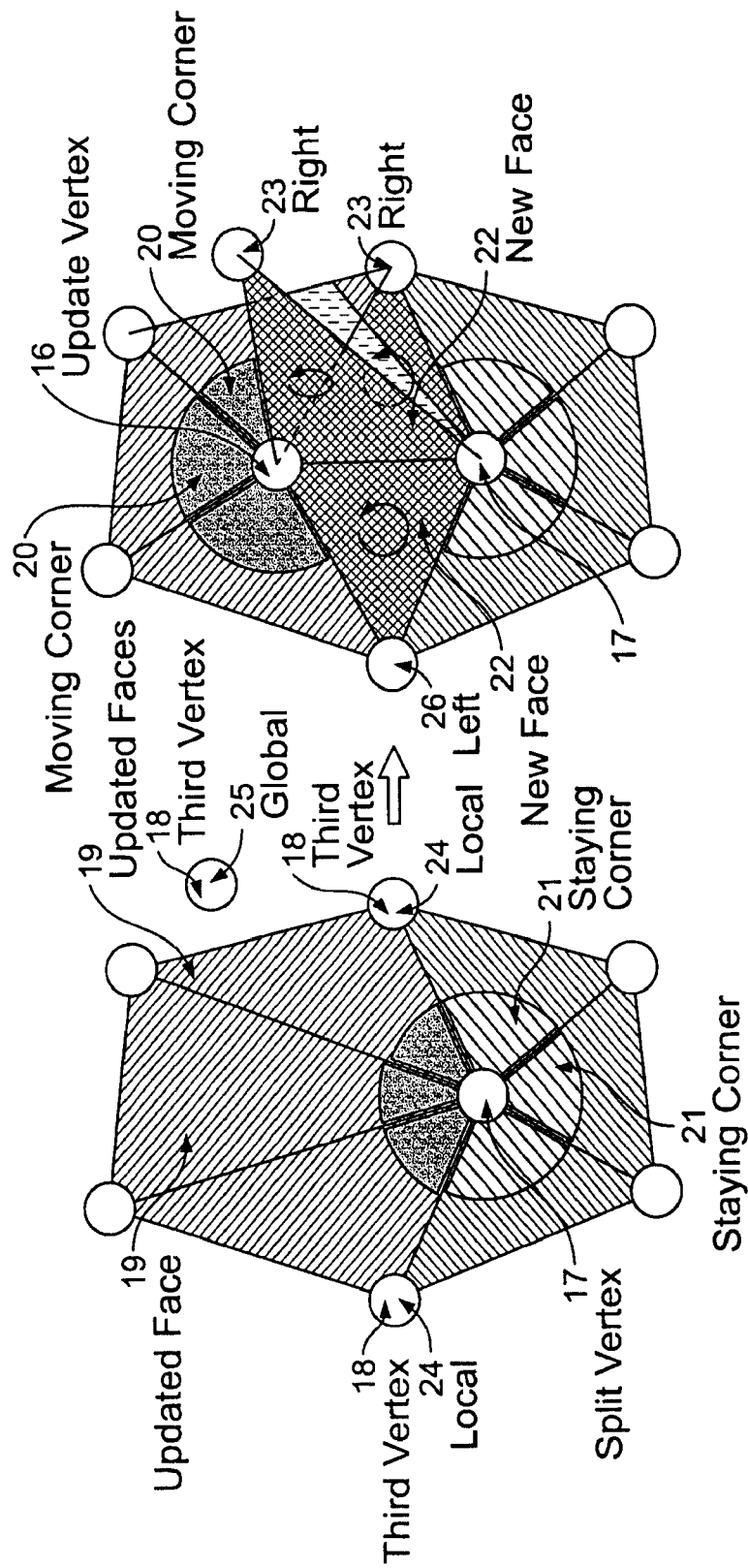
FIG. 5 is a block diagram of an MRM vertex update showing definitions of elements that are used to classify a vertex update.

Referring to FIG. 5, a newly-introduced vertex is called an "update vertex" 16. The vertex at which the MRM splits is called the "split vertex" 17. Existing faces that are affected by this split are called "updated faces" 19. The "moving corners" 20 are corners of these faces that move from split vertex 17 to update vertex 16. The "staying corners" 21 are all other corners around split vertex 17 that do not move during updating. The newly-introduced faces are called "new faces" 22. New faces 22 are formed by split vertex 17, update vertex 16, and a "third vertex" 18.

Depending on the "winding order" of a resulting new face, the third vertex is classified as "right" 23 or "left" 26. In this context, winding order is the order that a new face is traversed during rendering. If the winding order is "split vertex, third vertex, update vertex", process 15 classifies the third vertex as "right". If the winding order is "split vertex, update vertex, third vertex", process 15 classifies the third vertex as "left".

The intuition behind "right" and "left" is as follows: if one looks from the split vertex 17 to the update vertex 16, then the third vertex is to the right for front-facing faces with the winding order "split vertex, third vertex, update vertex" and to the left for front-facing faces with the winding order "split vertex, update vertex, third vertex". In most graphics APIs (Application Programming Interfaces), a polygon is front-facing when the winding order is counterclockwise when looking at its front side.

Process 15 also classifies the third vertices as "local" or "global". If the third vertex is connected to the split vertex 17 before an update, the third vertex is defined as "local" 24, otherwise it is defined as "global" 25. Process 15 defines the third vertex as local so that process 15 can address the third vertex locally as the first, second, third, etc. neighbor of the split vertex, as described below.

Various different types of MRM updates are shown in FIGS. 3 and 6 to 15. These MRM updates can be described in terms of the compression information noted above.

Figure 6:
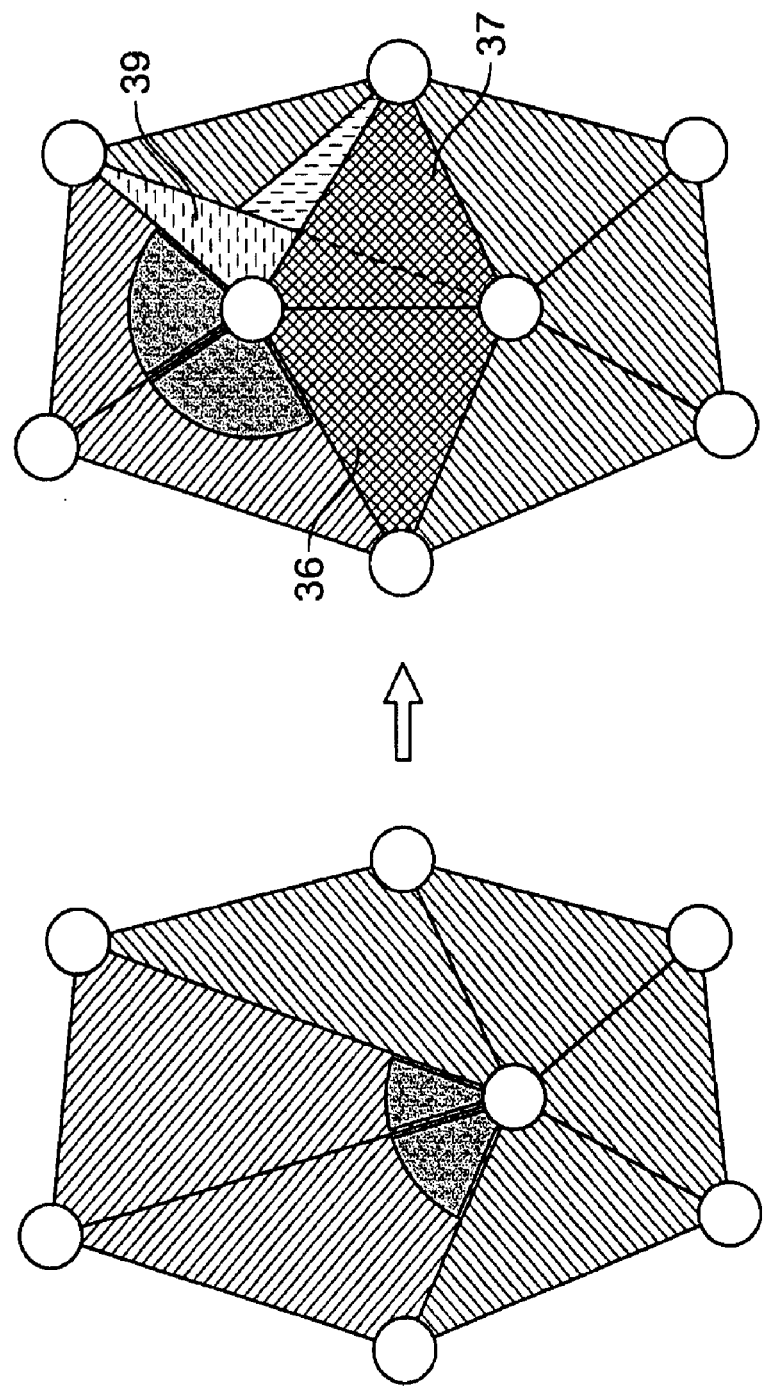
FIGS. 6 to 15 are block diagrams of MRM vertex updates.
Figure 7:
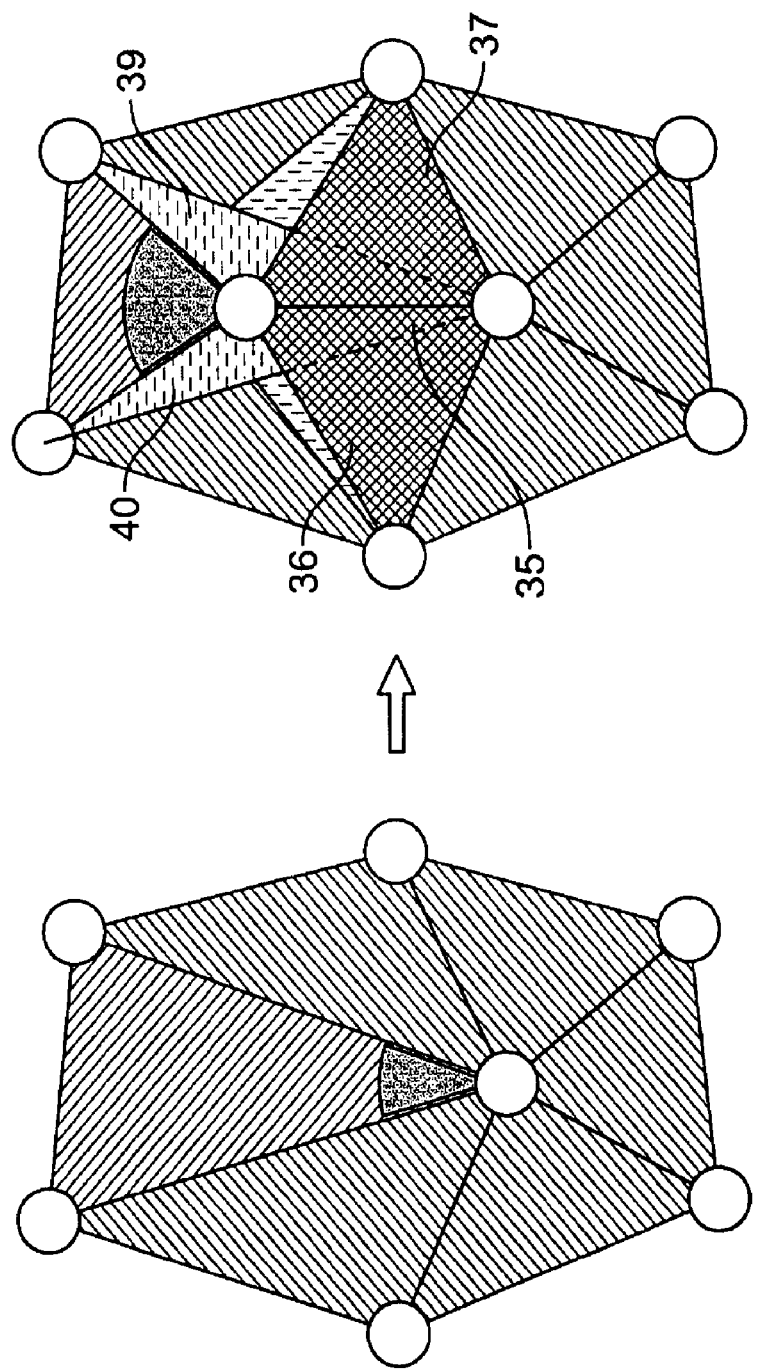
Figure 8:
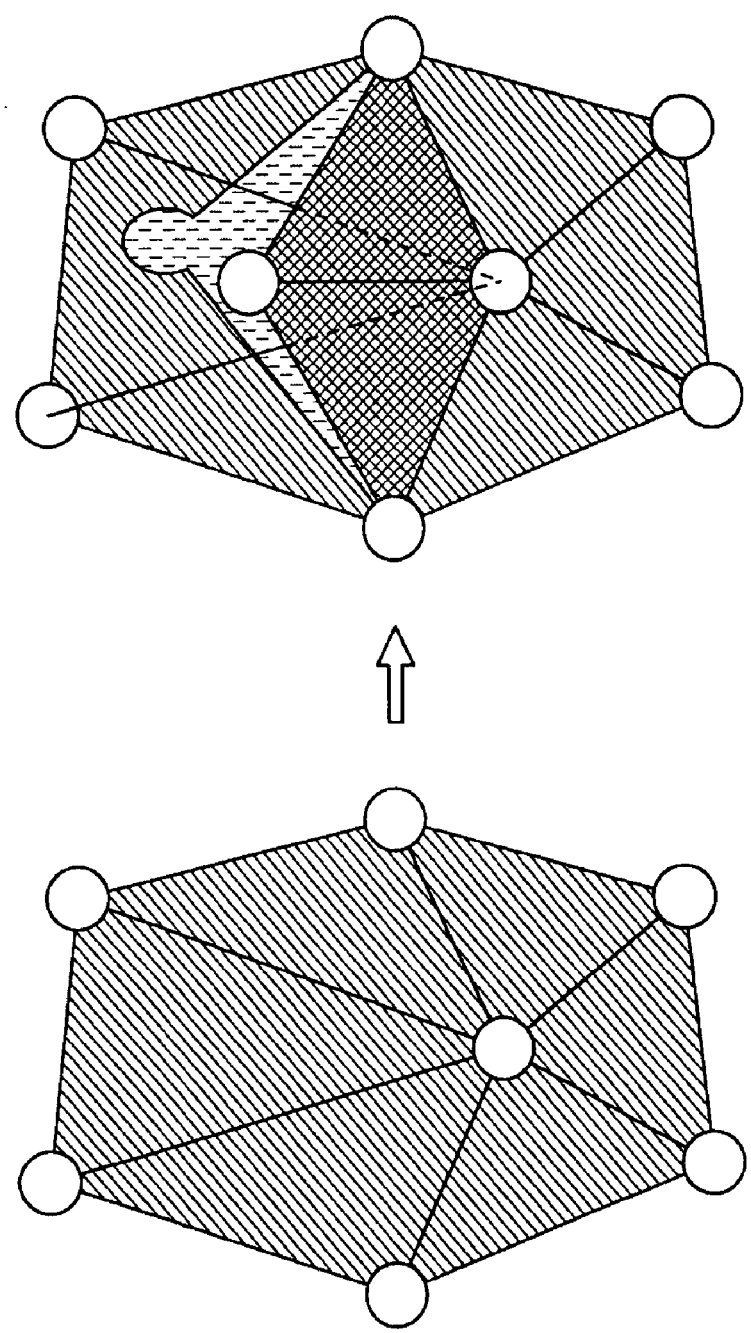
Figure 9:
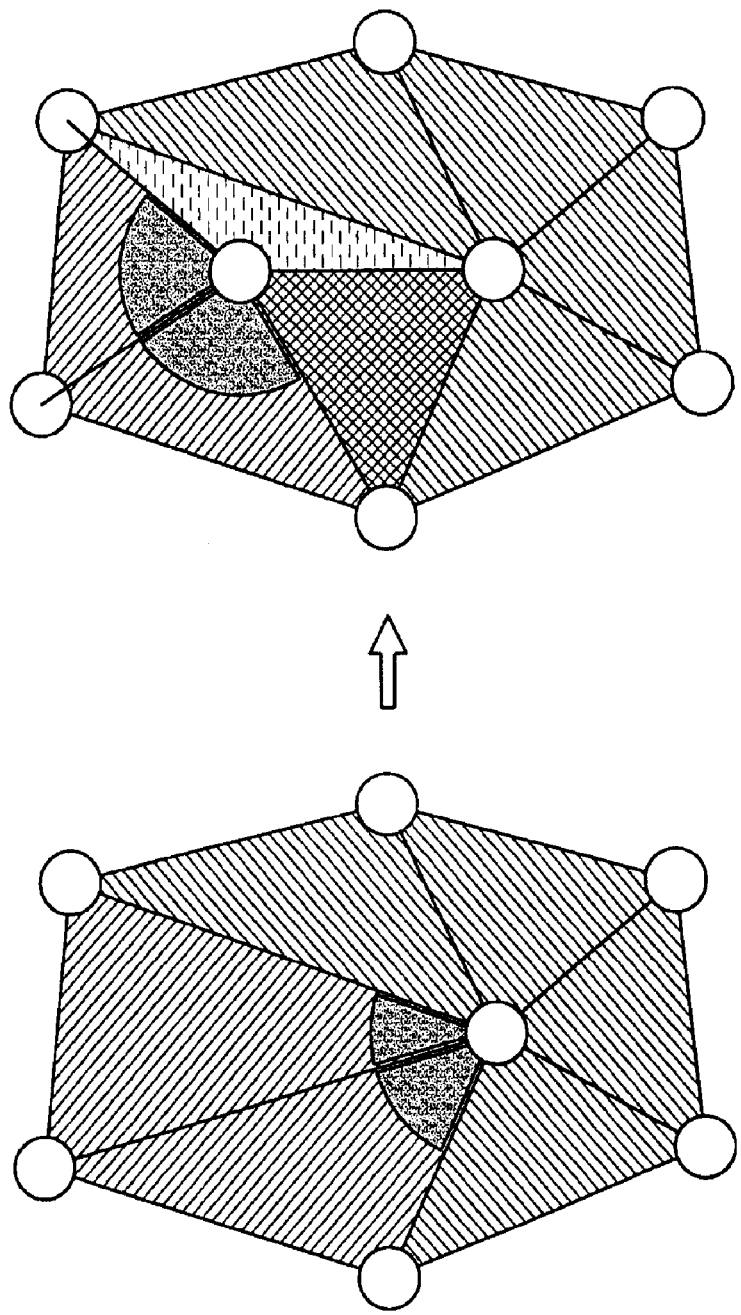
Figure 10:
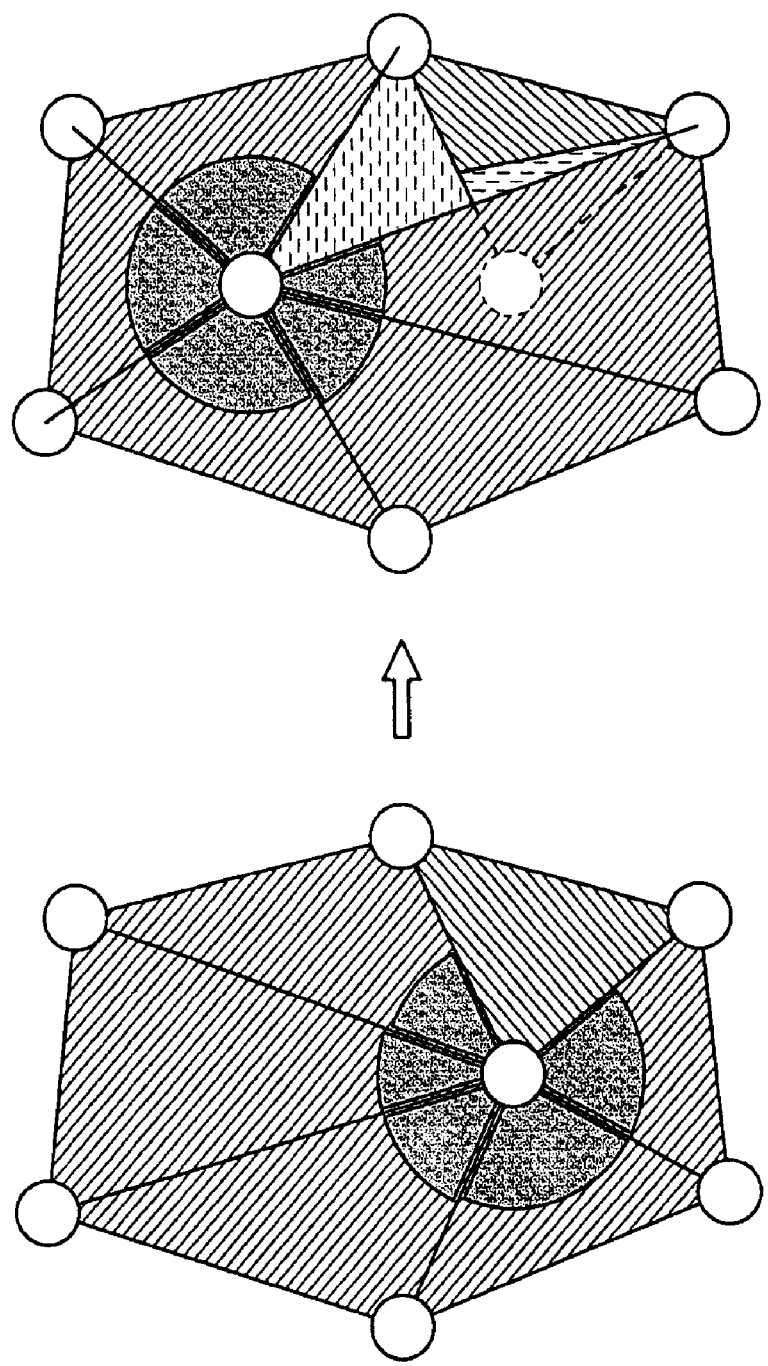
Figure 11:
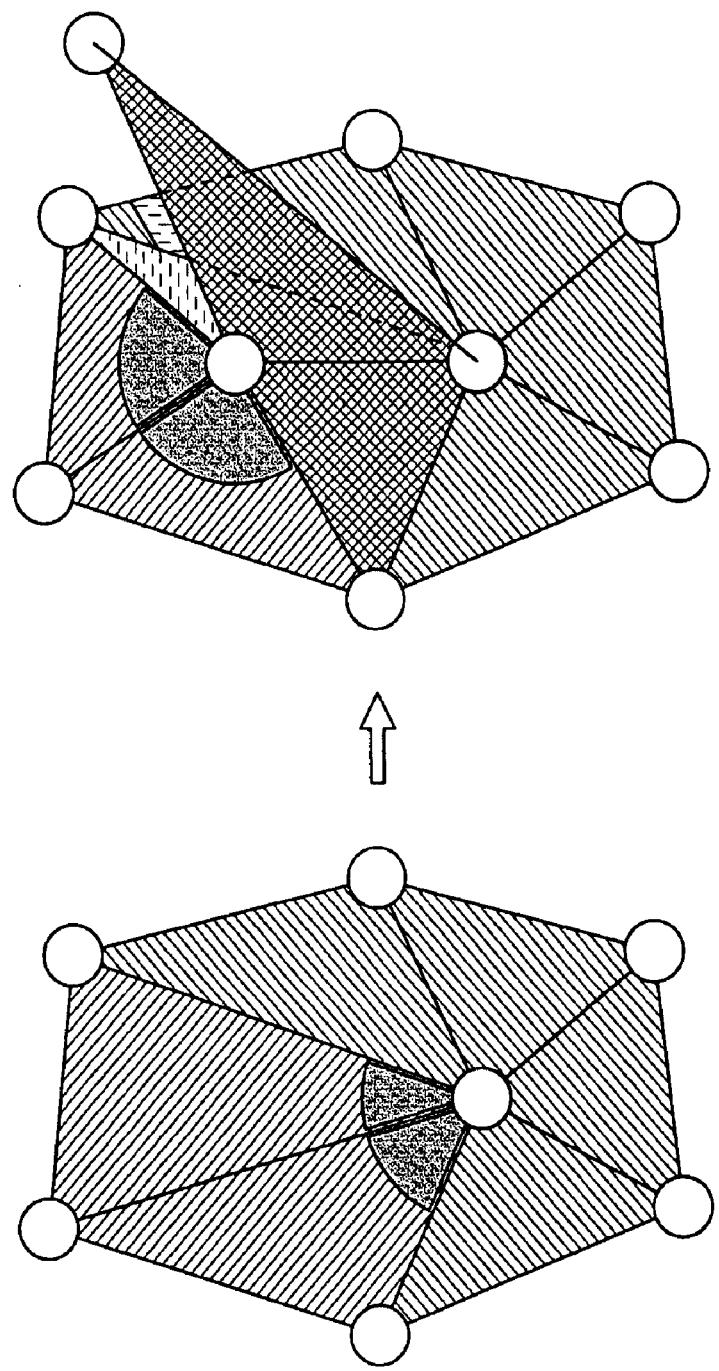
Figure 12:
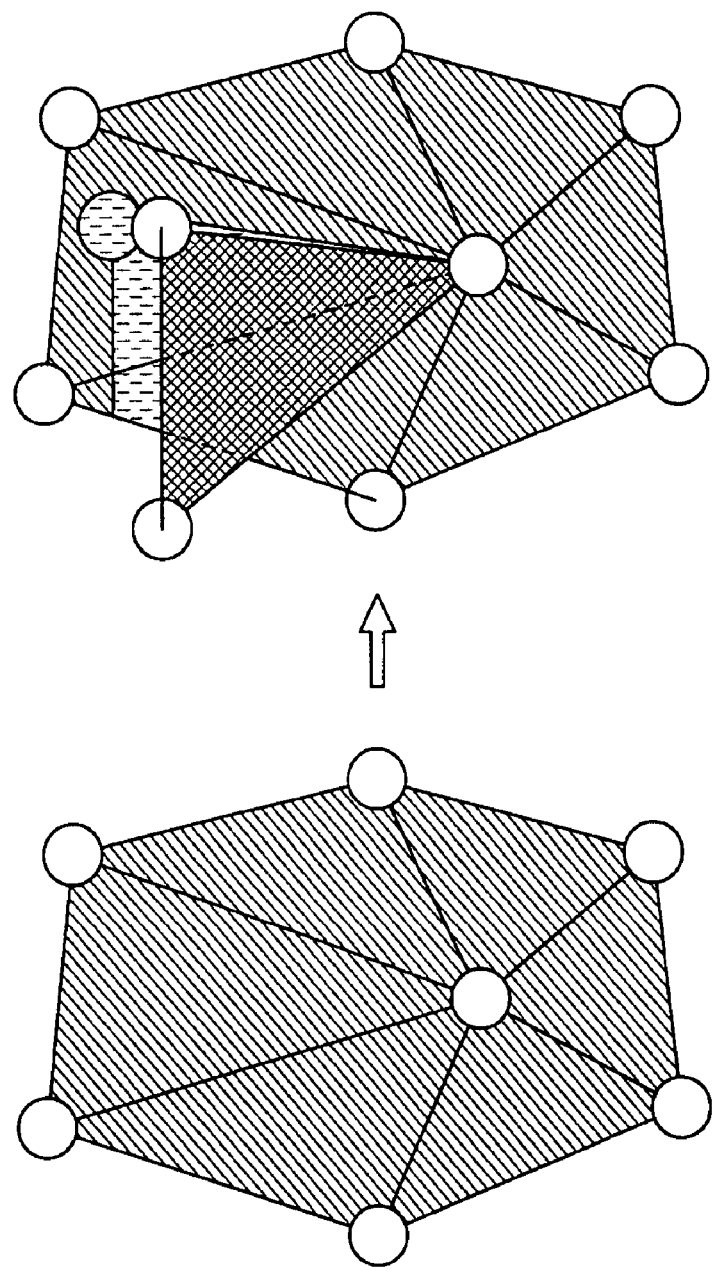
Figure 13:
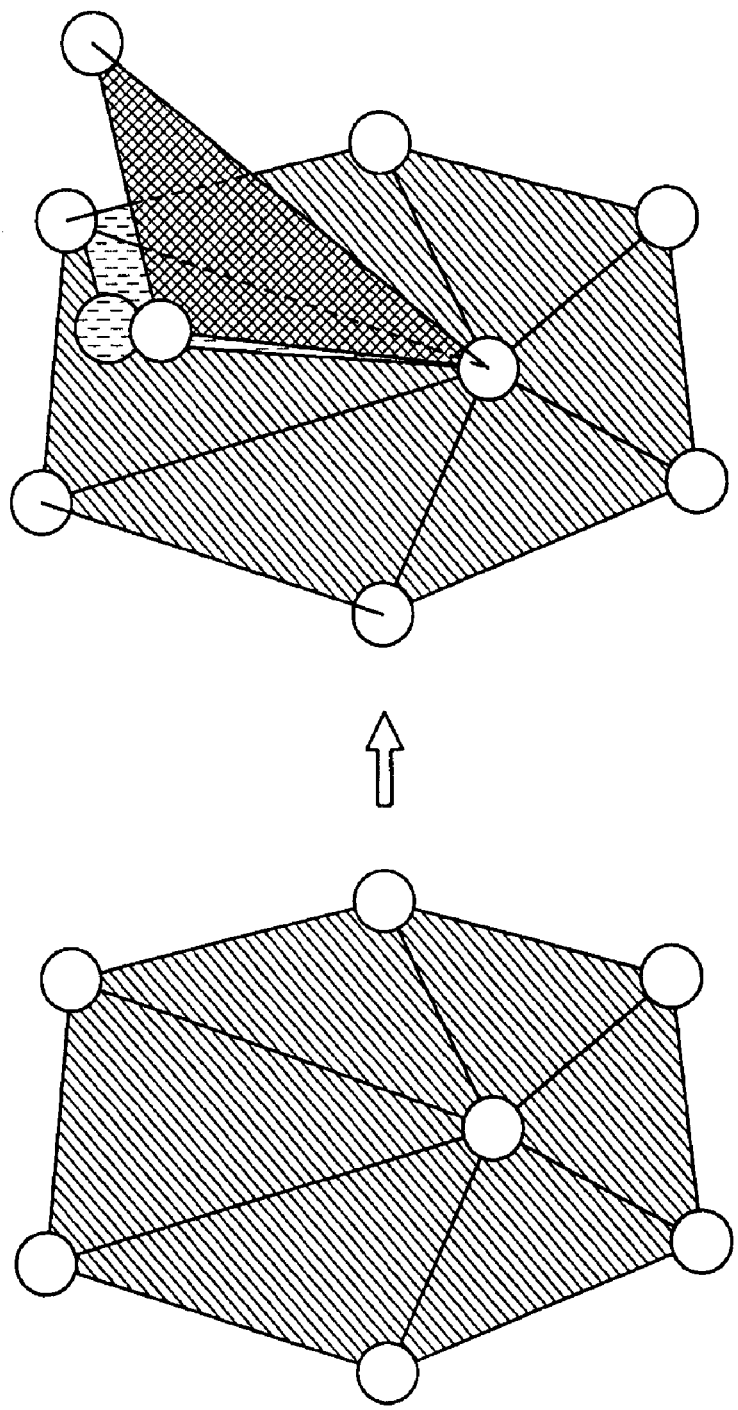
Figure 14:
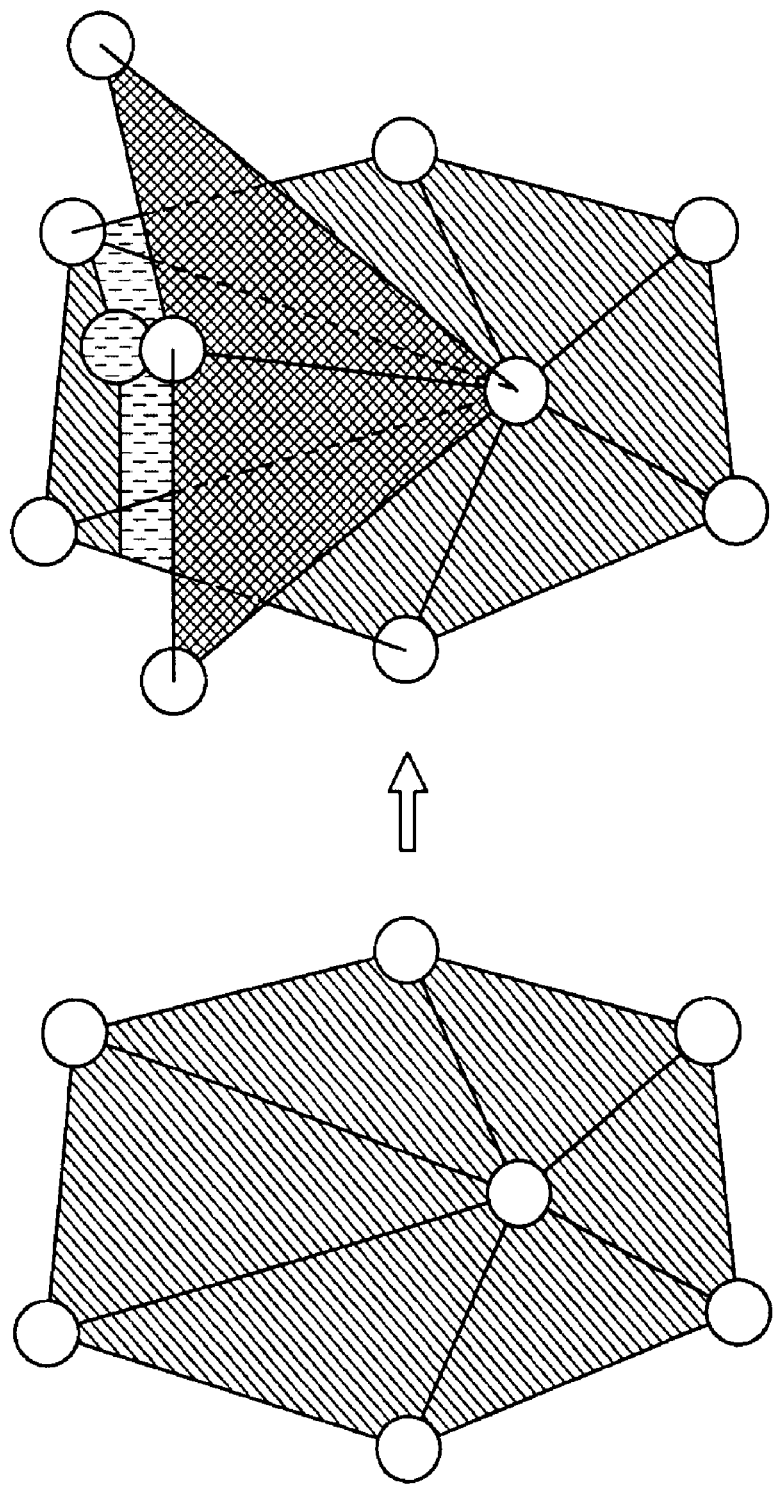
Figure 15:
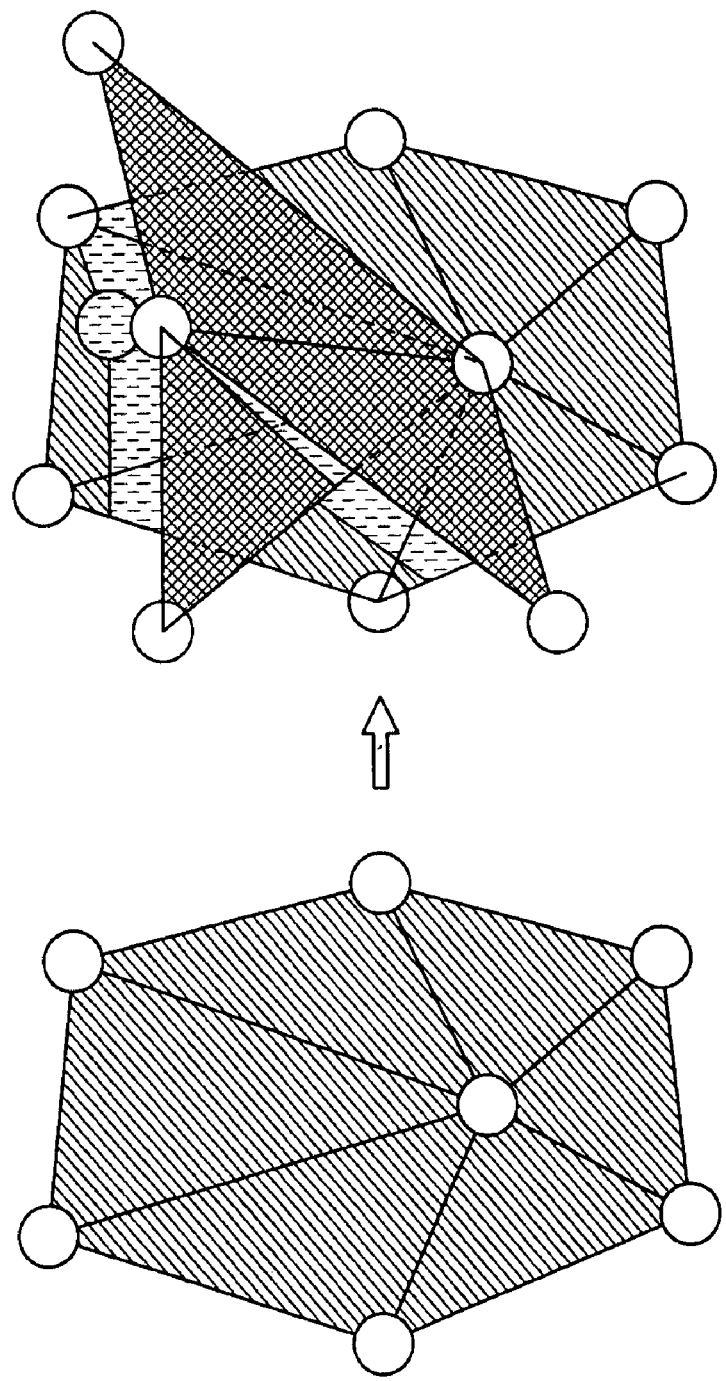

FIG. 3 shows splitting vertex 10 by moving three corners 27, 29 and 30. This update creates a "manifold" mesh in which no edge is used by more than two faces and each vertex has a neighborhood that is homeomorphic to a disk or a half-disk. FIG. 6 shows an MRM update that results in a non-manifold mesh. The edge 35 between the split vertex and the right third vertex is non-manifold, since it is adjacent to face 37 and hole 39 after the update. FIG. 7 shows an MRM update that results in a non-manifold mesh. The split vertex and the update vertex are non-manifold, since their neighborhoods are neither homeomorphic to a disk or a half-disk after the update. FIG. 8 shows an MRM update in which two new faces sit "on top" of the manifold mesh, thereby creating two non-manifold edges. FIG. 9 shows an MRM update that results in a non-manifold mesh, producing one new face and a "hole". FIG. 10 shows an MRM update that results in a non-manifold mesh, which produces no new faces and a "hole". The hole is formed because one of the corners of the polygon does not move during the update. FIGS. 11 to 15 show examples of other possible configurations for an MRM update.

Figure 16:
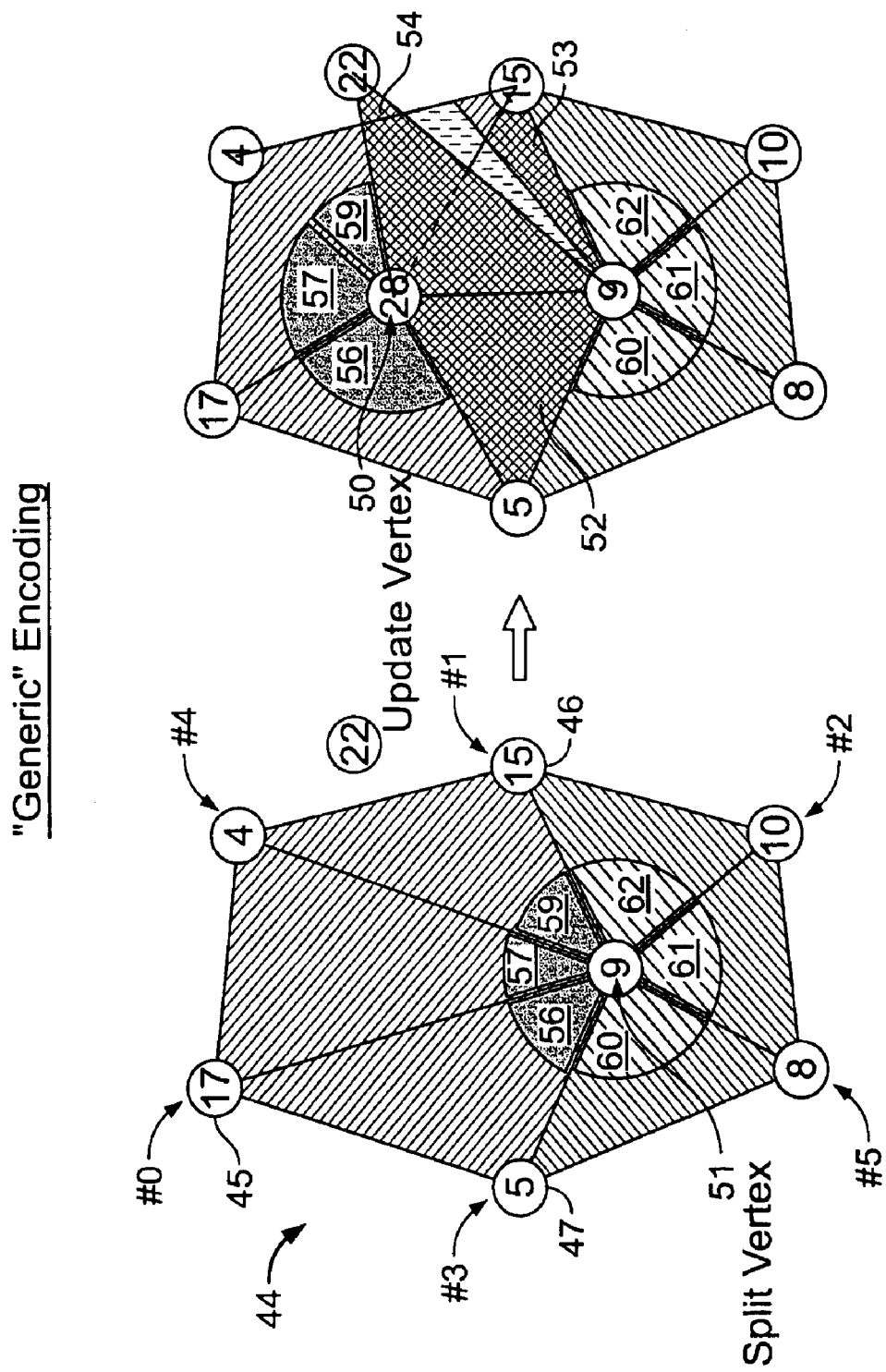
FIG. 16 is a block diagram of a (non-manifold) MRM vertex update (the same as FIG. 5) that is used to describe generic encoding of a vertex update.
Figure 17:
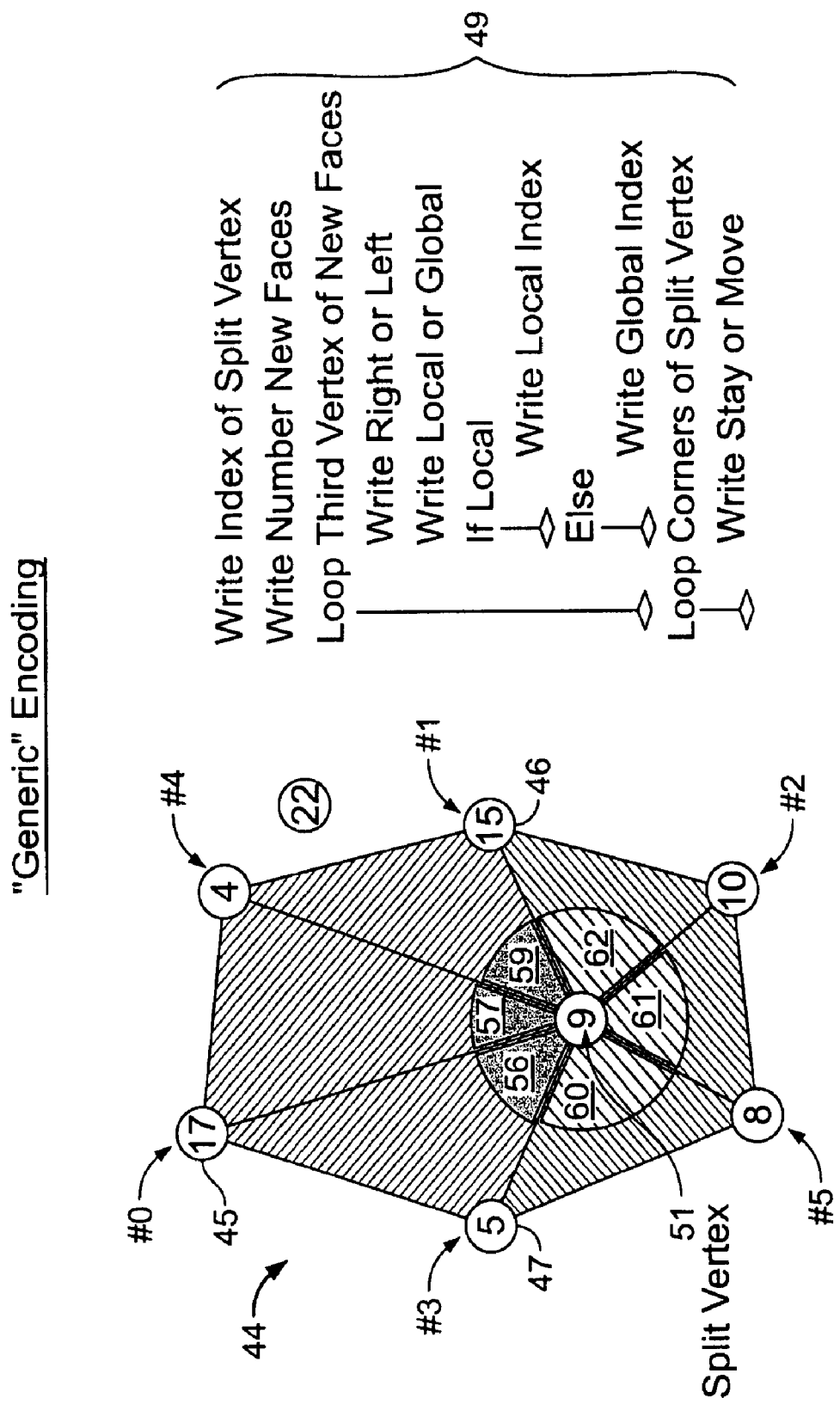
FIG. 17 is a block diagram of the non-updated MRM from FIG. 16 and a flow diagram of a process for generic encoding of a vertex update.

Referring to FIGS. 16 and 17, an MRM 44 is shown. Each vertex of the MRM has a global index that can be used to reference the vertex. This index is implicitly determined by the vertex update that introduces the vertex. A vertex that is introduced by an $i^{th}$ vertex update has an index i−1 (for i>1). For example, vertex 45 has a global index of 17. That means that vertex 45 was introduced by the $18^{th}$ vertex update. Similarly, vertex 46 has a global index of 15 and vertex 47 has a global index of 5, which means that they were introduced by the $16^{th}$ and $6^{th}$ vertex updates, respectively. The actual 3D positions of the vertices are stored in an array of 3D positions in the order in which they were introduced. This way, the global index of a vertex addresses its position in this array. Encoding of MRM 44 may be performed as follows.

Assume that process 49 (FIG. 17) encodes the $29^{th}$ vertex update that introduces vertex 50, which will have the global index 28. The MRM, in this case, has currently only 28 vertices. Therefore, the global index of the split vertex will be a number between 0 and 27. Assume further that there is some type of neighbor mesh that allows process 49 to iterate over the neighboring vertices and neighboring faces (or rather their corresponding neighboring corners) of the split vertex. Such an iteration defines a unique enumeration (ordering) of the neighbors of the split vertex.

Referring to FIG. 17, process 49 encodes the update as follows. Process 49 locates the vertex 51 that is split by the vertex update. Process 49 encodes the vertex 51 that is split. That is, process 49 writes (i.e., stores) the global index of the split vertex 51, in this case 9, knowing that it will be a number between 0 and 27. Process 49 records the number of new faces introduced by this vertex update, in this case three (faces 52, 53 and 54 from FIG. 16).

Process 49 also specifies for each new face which third vertex it uses and which winding order it has, as follows: RIGHT/LEFT specifies the winding order of the new face. RIGHT indicates that the winding order is split vertex, third vertex, update vertex. LEFT indicates that the winding order is update vertex, third vertex, split vertex.

LOCAL/GLOBAL indicates the indexing scheme used for addressing the third vertex of the new face.

LOCAL indicates that a local indexing scheme is used, since the third vertex of the new face is currently a neighbor of the split vertex. In this case, a local index into an enumeration of the neighboring vertices of the split vertex is used to specify the third vertex. This is a number between 0 and the number of vertices that are neighbors of the split vertex minus one. In the example, split vertex 51 has six neighboring vertices. Hence, the local index will be a number between 0 and 5. Assume, for example, that the third vertex 47 appears as the fourth vertex in the enumeration of the vertices that are neighbors of the split vertex. Then, its local index is 3. Assume further, that the third vertex 46 appears as the second vertex in the enumeration of the vertices that are neighbors of the split vertex. Then its local index is 1. No specific order is required to define the local indices, as long as the encoder that encodes the MRM and the decoder that decodes the MRM use the same order.

GLOBAL indicates that a global indexing scheme is used, since the third vertex of the new face is not currently a neighbor of the split vertex. In this case, the global index is used to specify the third vertex. This is a number between 0 and the number of vertices in the MRM. In the example, one third vertex 54 is not a neighbor of split vertex 51. Its global index 22 is encoded knowing that it will be a number between 0 and 27. Writing local indices as opposed to global indices can save significant bandwidth, particularly for meshes with many vertices for which global indices would require many bits to express.

Process 49 also specifies which corners of the split vertex (e.g., 56, 57, 59) move during the MRM vertex update from the split vertex to the update vertex and which corners of the split vertex (e.g., 60, 61, 62) stay at the split vertex. To do this, process 49 simply loops over a list of all corners surrounding the split vertex 51 and records (i.e., writes/ stores) the corresponding symbol "STAY" or "MOVE". The corners can be listed in any order as long as encoder and decoder use the same order.

Figure 18:
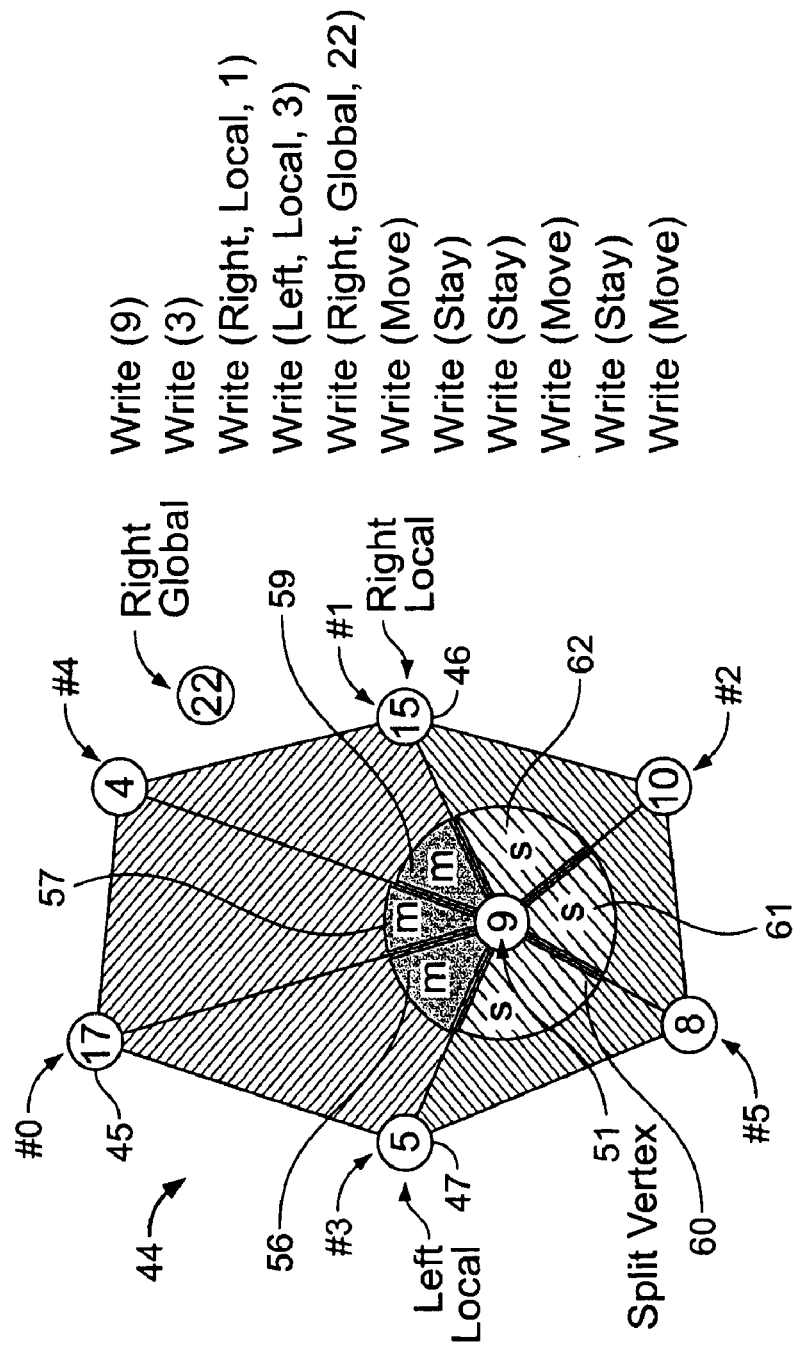
FIG. 18 is a block diagram that includes the non-updated MRM of FIG. 16 and compression code generated by the process of FIG. 17.

Referring to FIG. 18, encoding the vertex update of FIG. 16 using process 49 produces the following compression code (shown below with explanatory notes):

(1) WRITE "9" FOR THE INDEX OF THE SPLIT VERTEX—FOR COMPRESSION WE CAN EXPLOIT THE FACT THAT THE INDEX "9" HAS TO BE A NUMBER BETWEEN 0 AND 27

(2) WRITE "3" FOR THE NUMBER OF NEW FACES (3) WRITE "RIGHT", "LOCAL", AND "1" FOR THE NEW FACE (DEFINED BY VERTICES 9, 15, 28)— FOR COMPRESSION WE CAN EXPLOIT THE FACT THAT THE INDEX "1" HAS TO BE A NUMBER BETWEEN 0 AND 5

(4) WRITE "LEFT", "LOCAL", AND "3" FOR THE NEW FACE (DEFINED BY VERTICES 28, 5, 9)—FOR COMPRESSION WE CAN EXPLOIT THE FACT THAT THE INDEX "3" HAS TO BE A NUMBER BETWEEN 0 AND 5

(5) WRITE "RIGHT", "GLOBAL", AND "22" FOR THE NEW FACE (DEFINED BY VERTICES 9,22,28)— FOR COMPRESSION WE CAN EXPLOIT THE FACT THAT THE INDEX "22" HAS TO BE A NUMBER BETWEEN 0 AND 27

(6) WRITE "MOVE" (m)
(7) WRITE "STAY" (S)
(8) WRITE "STAY"
(9) WRITE "MOVE"
(10) WRITE "STAY"
(11) WRITE "MOVE"

It is noted that, for the purposes of this application, "write" in the compression code refers to writing (i.e., storing) the associated data in a bit-stream using an adequate standard coding technique, examples of which include Huffman coding, range coding, and arithmetic coding.

The coding process 49 described above, entitled "Generic Coding" in FIGS. 16 to 18, can be employed to encode any type of MRM update (examples of different MRM updates are shown FIGS. 3 and 6 to 15). Using "Generic Encoding", the "roman patch" 64 of FIG. 19 compresses to about 35 KiloBytes (KB) for multi-resolution connectivity and positions. Modifications to the generic coding process 49 of FIG. 17 that may improve compression are described below.

Figure 20:
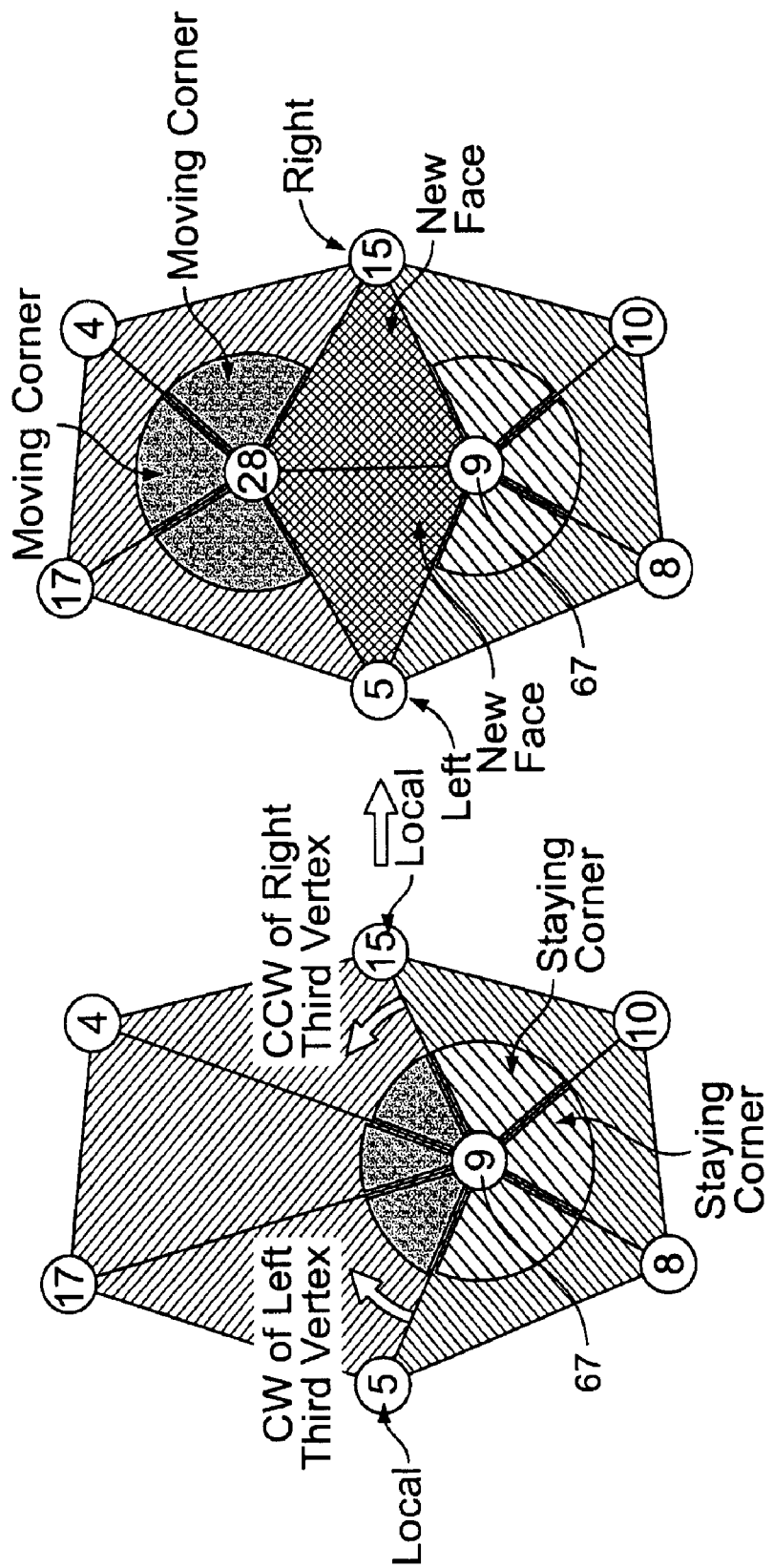
FIG. 20 is a block diagram of a (manifold) MRM vertex update (the same as FIG. 3) that is used to describe manifold encoding of a vertex update.

FIG. 20 shows a modification to process 49 for an improved encoding of vertex updates that occur frequently in typical meshes, namely manifold vertex updates. These frequently occurring manifold vertex updates have the following characteristics:

(1) TWO NEW FACES ARE INTRODUCED
(2) ONE THIRD VERTEX IS RIGHT, THE OTHER IS LEFT, BOTH THIRD VERTICES ARE LOCAL (3) ALL CORNERS THAT ARE COUNTERCLOCKWISE (CCW) OF THE RIGHT THIRD VERTEX AND CLOCKWISE (CW) OF THE LEFT THIRD VERTEX ARE MOVING CORNERS (4) ALL OTHER CORNERS ARE STAYING CORNERS

These qualifications mean that it is enough to specify the two third vertices of a manifold vertex update in an agreed upon order in order to encode the update. All other updates to the MRM can be inferred from this information and therefore additional symbols need not be encoded.

Figure 21:
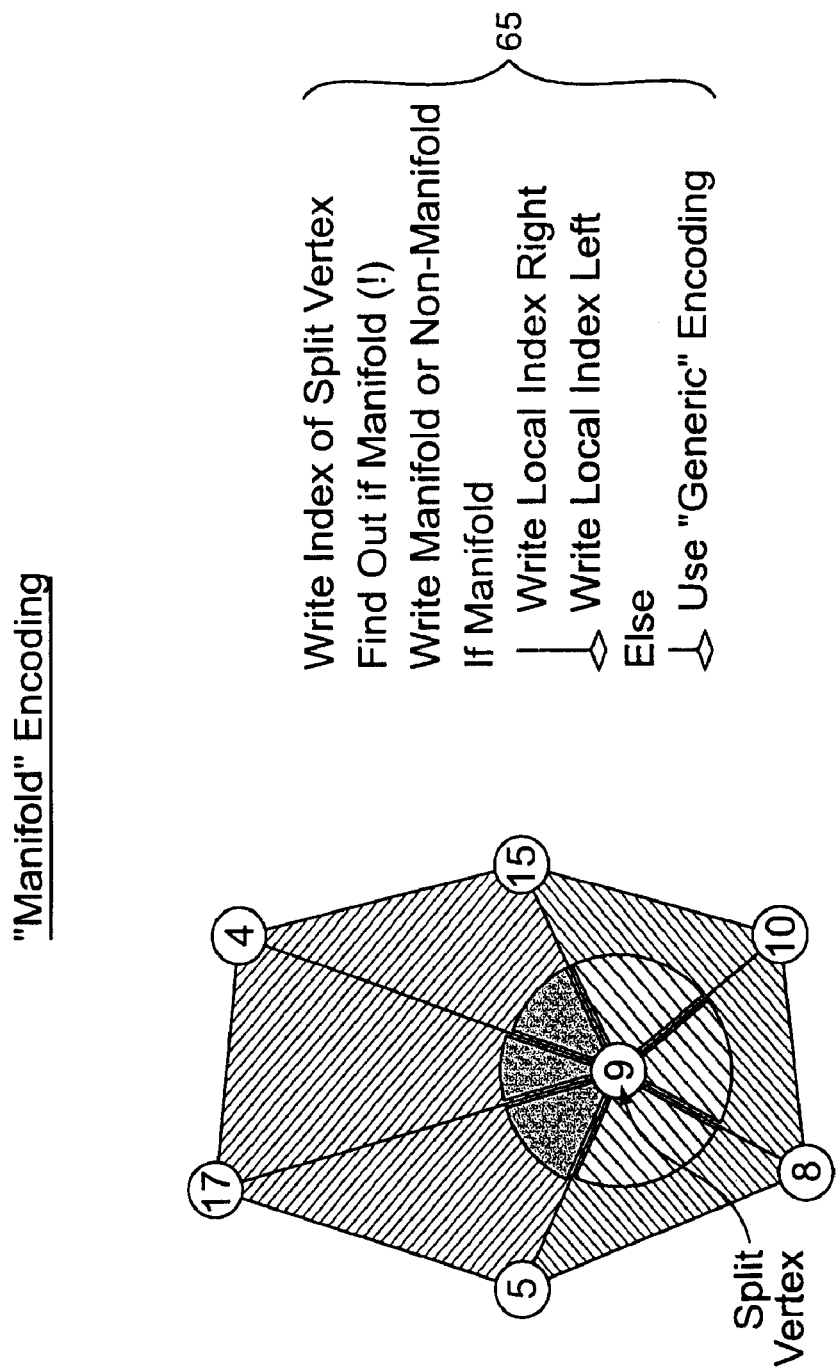
FIG. 21 is a block diagram of the non-updated MRM from FIG. 20 and a flow diagram of a process for manifold encoding of a vertex update.

FIG. 21 shows a process 65 for encoding a manifold vertex update. Process 65 specifies which vertex is split by recording its global index. Process 65 determines if the vertex update is manifold. A vertex update is manifold if (1) TWO NEW FACES ARE INTRODUCED (2) ONE THIRD VERTEX IS LEFT AND THE OTHER RIGHT (3) BOTH THIRD VERTICES ARE LOCAL (4) EVERY CORNER THAT CAN BE REACHED BY MOVING COUNTERCLOCKWISE FROM THE RIGHT THIRD VERTEX IS MOVING (5) EVERY CORNER THAT CAN BE REACHED BY MOVING CLOCKWISE FROM THE LEFT THIRD VERTEX IS MOVING (6) ALL MOVING CORNERS ARE REACHED DURING (4) AND (5) ABOVE Referring to FIG. 21, process 65 records whether the vertex update is manifold or not manifold by writing "MANIFOLD" or "NON-MANIFOLD", respectively. If the vertex update is manifold, process 65 writes the local index of the right third vertex and the local index of the left third vertex. Otherwise, process 65 uses the generic encoding process of FIGS. 16 to 18 to code the updates.

Since the process of encoding a manifold vertex update requires less data than the process of encoding a generic vertex update, and since typical meshes have a very large percentage of manifold vertex updates, it is worthwhile to write the additional "MANIFOLD"/"NON-MANIFOLD" flag.

The encoding process for a manifold vertex updates eliminates the need to write the number of faces (e.g., it will always be two), to write the winding order (RIGHT/LEFT) for the two new faces (one third vertex will always be RIGHT -> its index is written first, the other third vertex will always be LEFT -> its index is written second), to write the indexing method (LOCAL/GLOBAL) for the third vertex of the two new faces (the indexing method for both third vertices will always be LOCAL), and to write the MOVE/STAY flag for each corner around the split vertex (because all corners counterclockwise relative to a right third vertex and clockwise relative to a left third vertex move, whereas all others stay).

Figure 22:
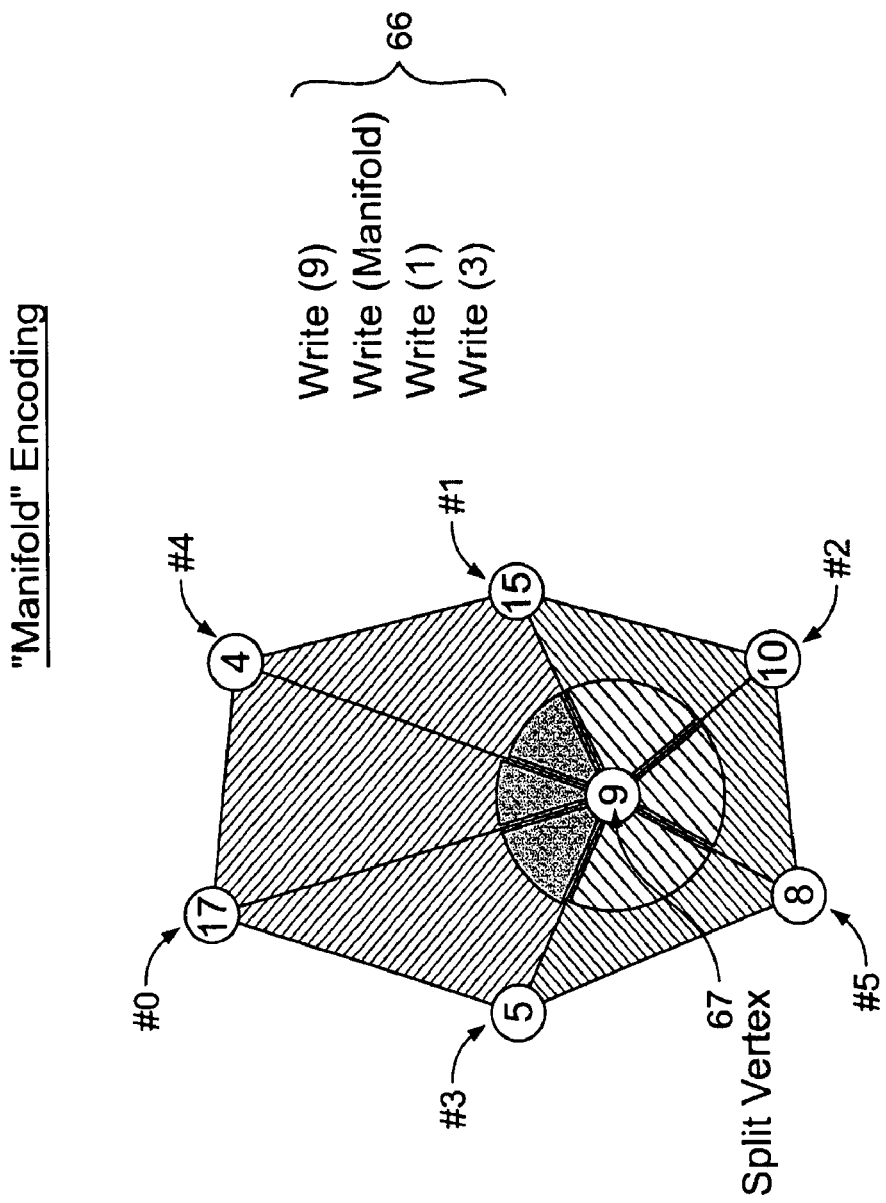
FIG. 22 is a block diagram that includes the non-updated MRM of FIG. 20 and compression code generated by the process of FIG. 21.

FIG. 22 shows code 66 that is produced to encode the manifold vertex update using the encoding process 65. Here, process 65 writes "9" for the global index of the split vertex 67, writes "MANIFOLD" to indicate a manifold vertex update, writes "1" for the local index of the right third vertex, and writes "3" for the local index of the left third vertex. When writing the global index "9", process 65 can exploit the fact that it is known to be between 0 and 27. When writing the local indices "1" and "3", process 65 can exploit the fact that they are known to be between 0 and 5.

Figure 19:
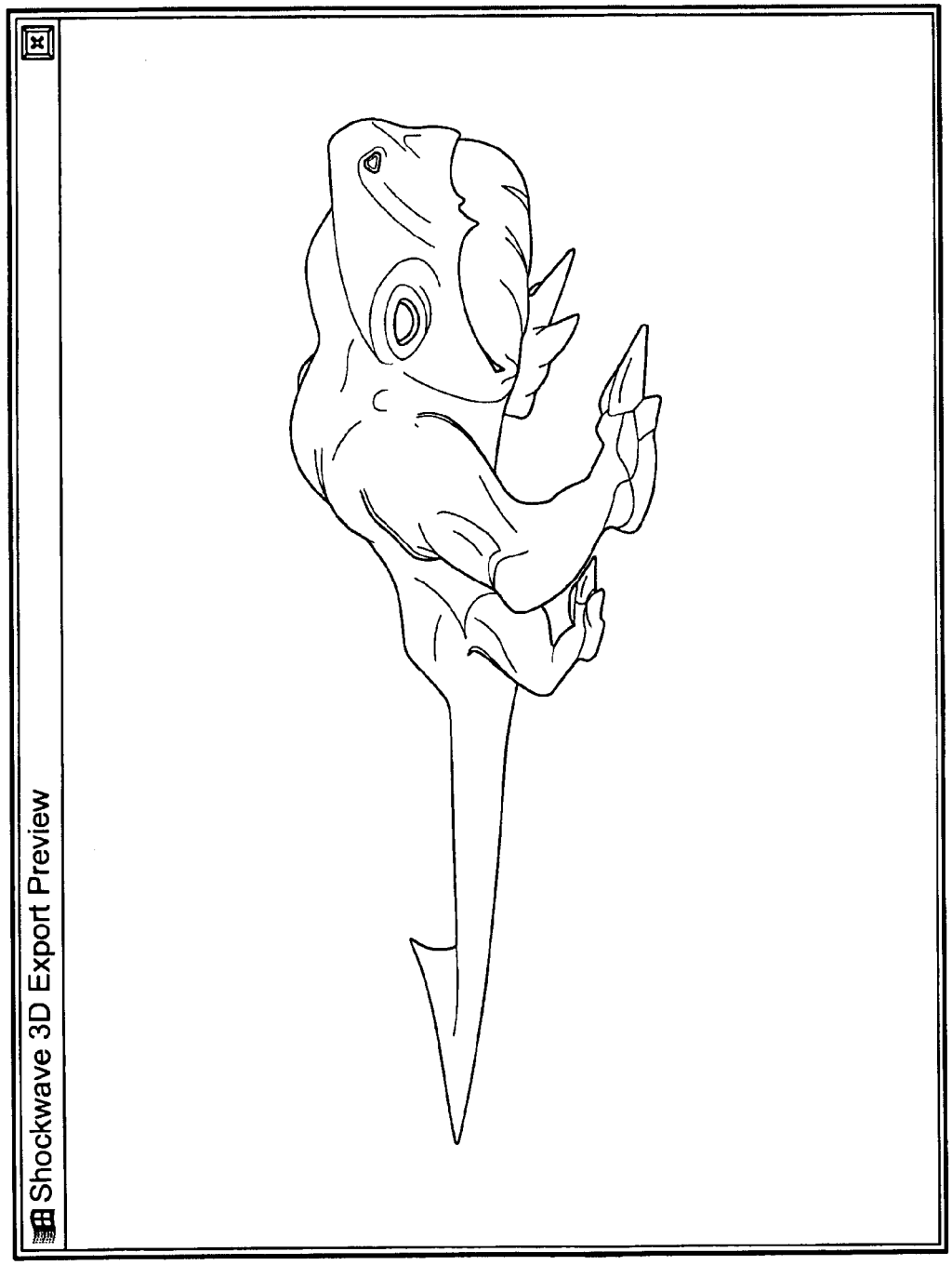
FIG. 19 is a shaded diagram of a polygonal surface mesh describing a three-dimensional (3D) model whose MRM representation may be encoded using the processes described herein.
Figure 23:
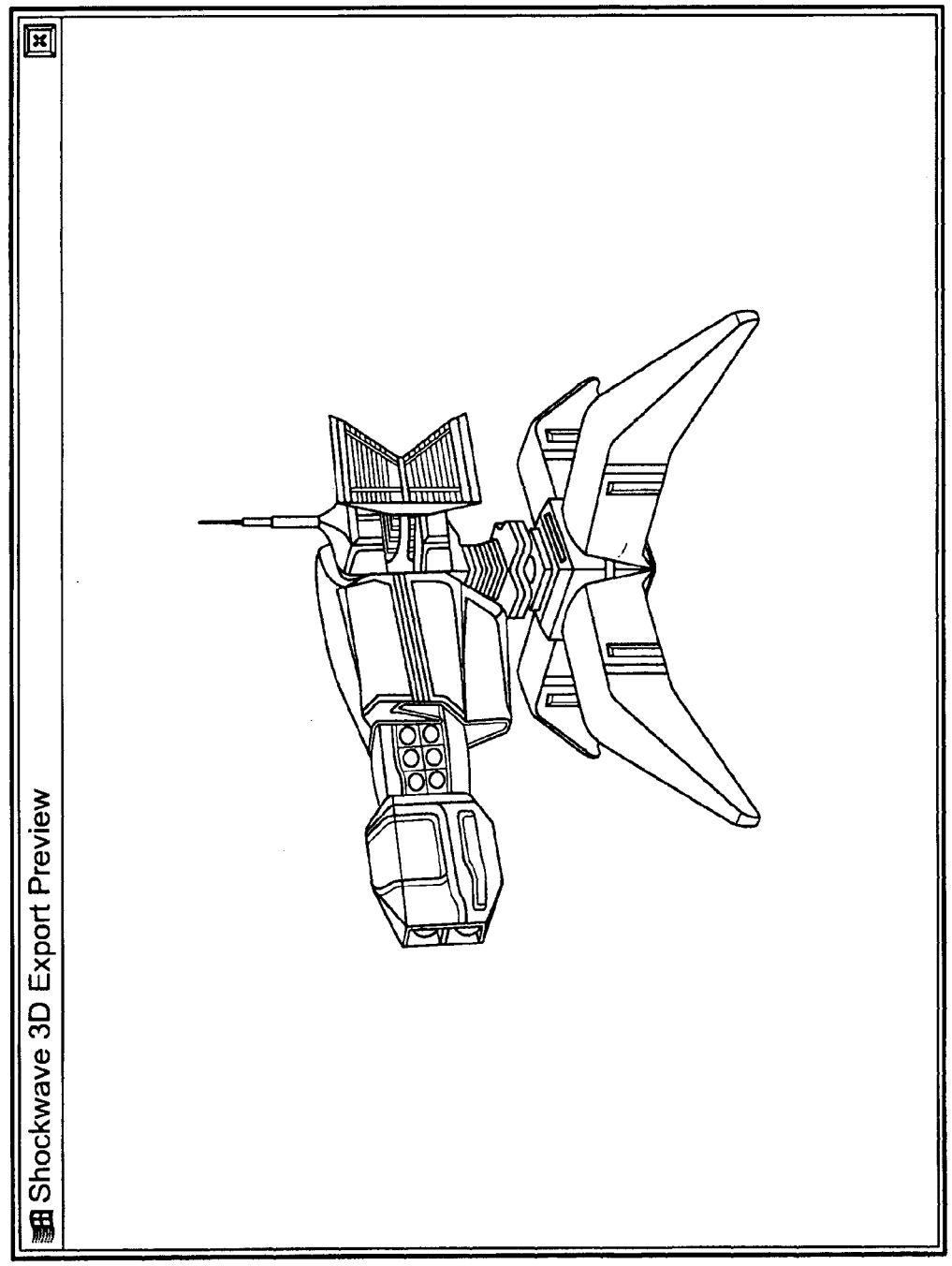
FIG. 23 is a shaded diagram of another polygonal surface mesh describing a three-dimensional (3D) model whose MRM representation may be encoded using the processes described herein.

Referring to FIG. 19, performing process 65 to encode vertex updates on the MRM of the "roman patch" model 64 reduces the file size to roughly 28.5 KB. This is because the MRM of the "roman patch" model has mostly manifold vertex updates. Only 30 of the total 5600 updates are non-manifold. FIG. 23 shows a "gunturret" model 71 whose MRM has 120 non-manifold vertex updates of 301 vertex updates in total. These 120 vertex updates are encoded with the generic encoding process. In models with such a large percentages of non-manifold vertex updates, predictive coding may be used. Like generic encoding, predictive encoding can also encode any kind of non-manifold vertex update, but does so more efficiently on typical non-manifold vertex updates.

Figure 24:
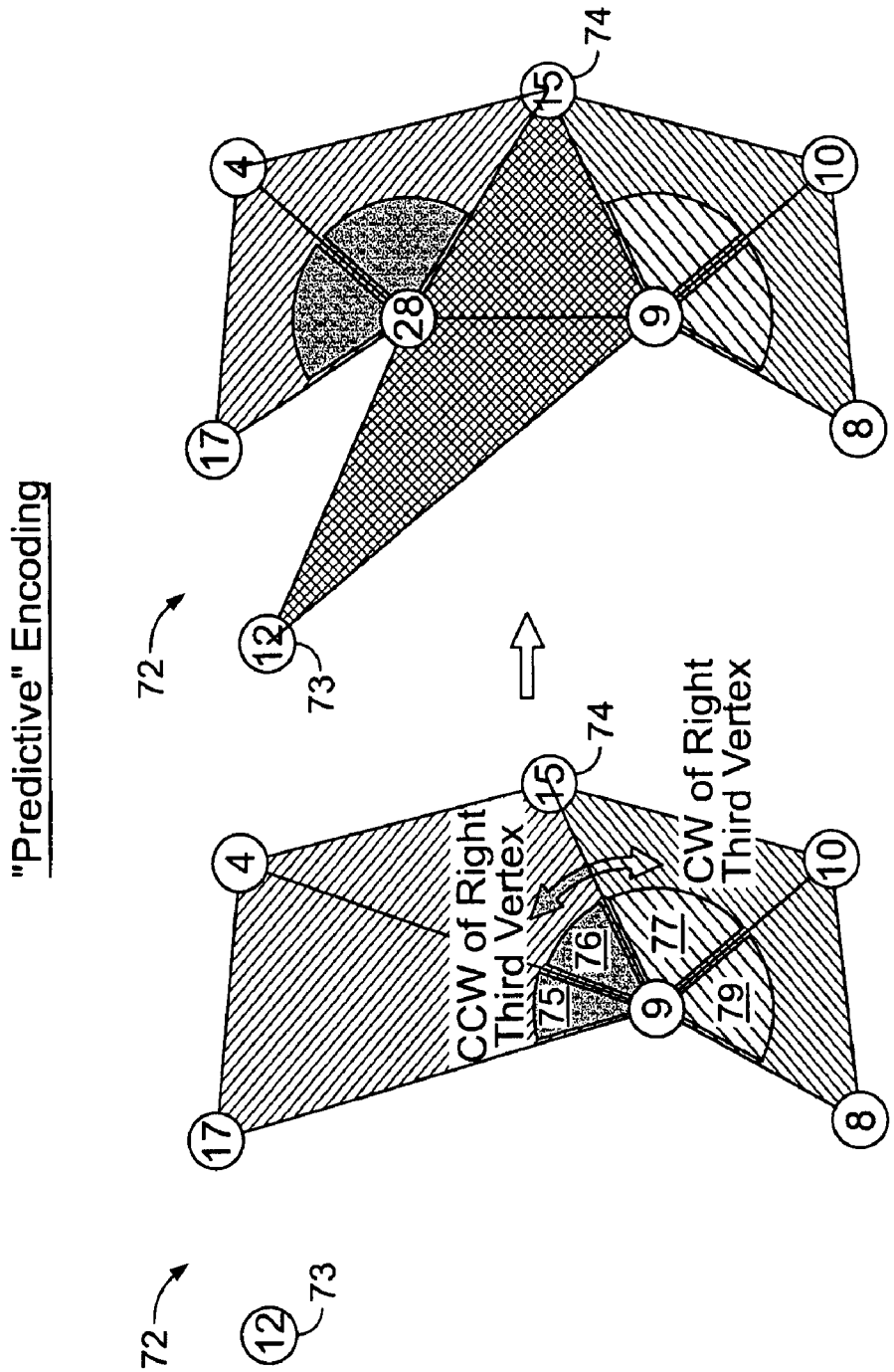
FIG. 24 is a block diagram of a (non-manifold) MRM vertex update that can be efficiently compressed with predictive encoding of a vertex update.

Referring to FIG. 24, mesh 72 falls under the non-manifold category because one of the two third vertices 73 is global instead of local. Nevertheless, there is a strong correlation between the staying and moving corners and the local right third vertex 74. All corners that are counterclockwise (ccw) (75, 76) of the right third vertex are moving corners and all corners that are clockwise (cw) (77, 79) of the right third vertex are staying corners.

Figure 25:
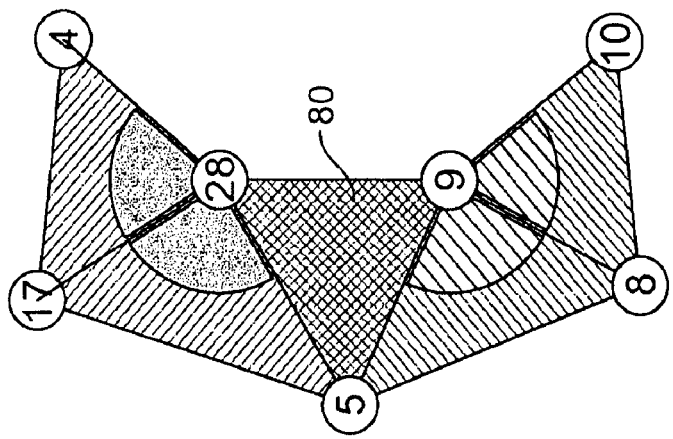
FIG. 25 is a block diagram of a (non-manifold) MRM vertex update that is used to describe predictive encoding of a vertex update.
Figure 25:
Figure 25:
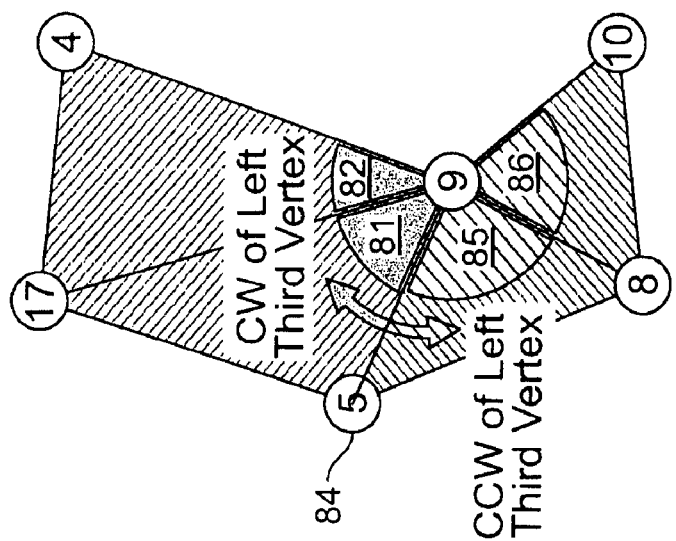

The MRM update shown in FIG. 25 also falls under the non-manifold category because only one new face 80 results. But, the foregoing correlation is still there: all corners (85, 86) that are counterclockwise of the left third vertex 84 are staying corners and all corners (81, 82) that are clockwise of the left third vertex 84 are moving corners.

Figure 26:
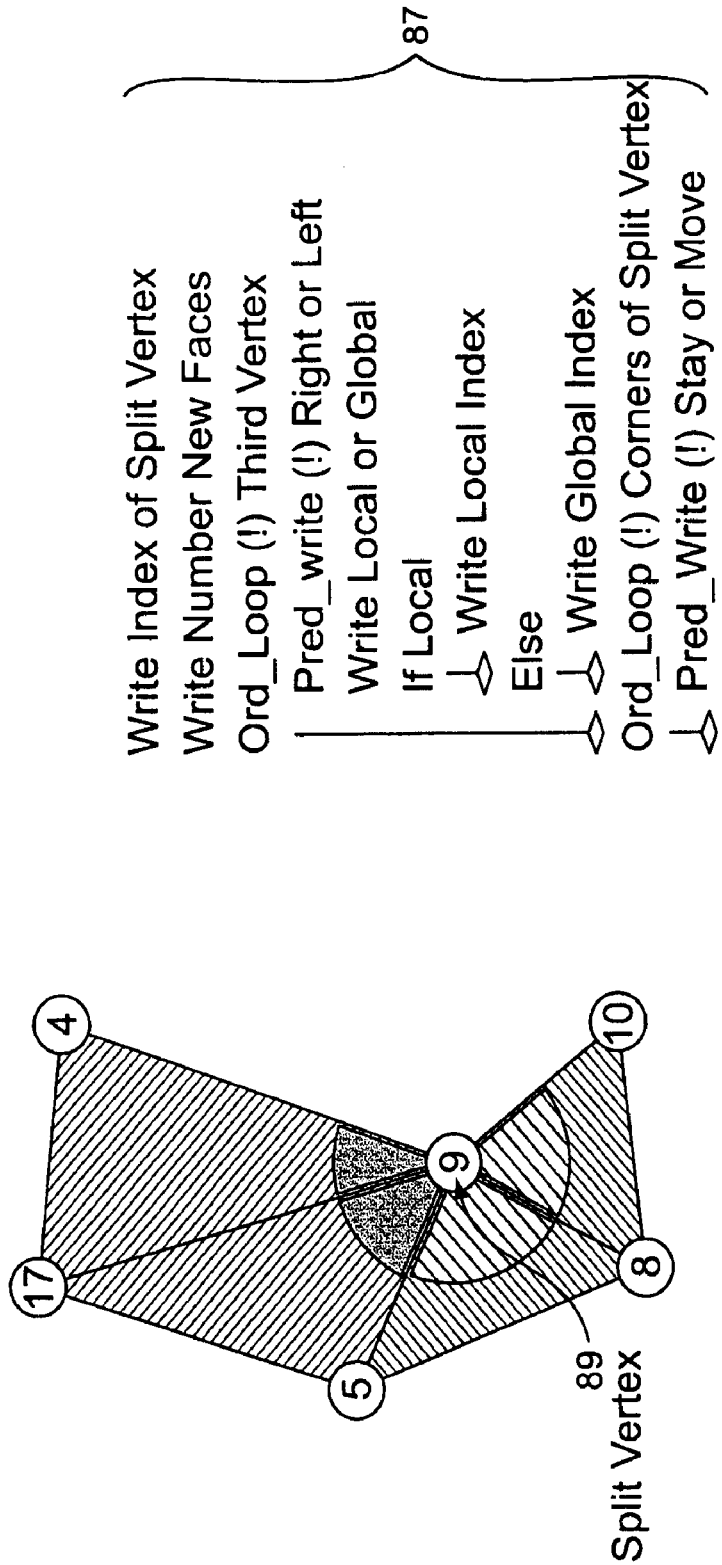
FIG. 26 is a block diagram of the non-updated MRM from FIG. 25 and a flow diagram of a process for predictive encoding of a vertex update.

FIG. 26 shows a predictive coding process 87 that may be used to encode the MRM updates of FIGS. 24 and 25. As before, process 87 records the global index of the vertex 89 that is split (updated). Process 87 specifies, for the third vertex of each new face, if that vertex is LEFT or RIGHT. If there is more than one third vertex, process 87 orders the largest even subset of third vertices so that they alternate (if possible) right/left/right/left/etc. Process 87 thus always predicts the vertices using this alternating sequence. Once a prediction is wrong, process 87 classifies the remaining third vertices based on the correction of the wrong prediction.

Process 87 records, for each third vertex, LOCAL/GLOBAL to indicate how that vertex is indexed. If the vertex is LOCAL, the vertex is classified as a neighbor vertex. In this case, the index of the vertex is a number between 0 and the number of neighbor vertices minus 1. In a case that the vertex is GLOBAL, the index is any global MRM vertex, i.e., a number between 0 and number of MRM vertices minus 1.

Process 87 specifies which corners MOVE and which corners STAY. Process 87 also makes predictions using the local third vertices. Process 87 "walks" counterclockwise from a right third vertex and predicts, for any corner that can be reached (before crossing another third vertex), that is moves. Process 87 "walks" counterclockwise from a left third vertex and predicts, for any corner that can be reached (before crossing another third vertex), that is stays. If, after this, there are still unclassified corners, process 87 "walks" clockwise from those third vertices and reverses its predictions. If there are then still unclassified corners, process 87 encodes the vertices as "unpredicted". Correct predictions require fewer bits to encode and thus produce more efficient compression.

Figure 27:
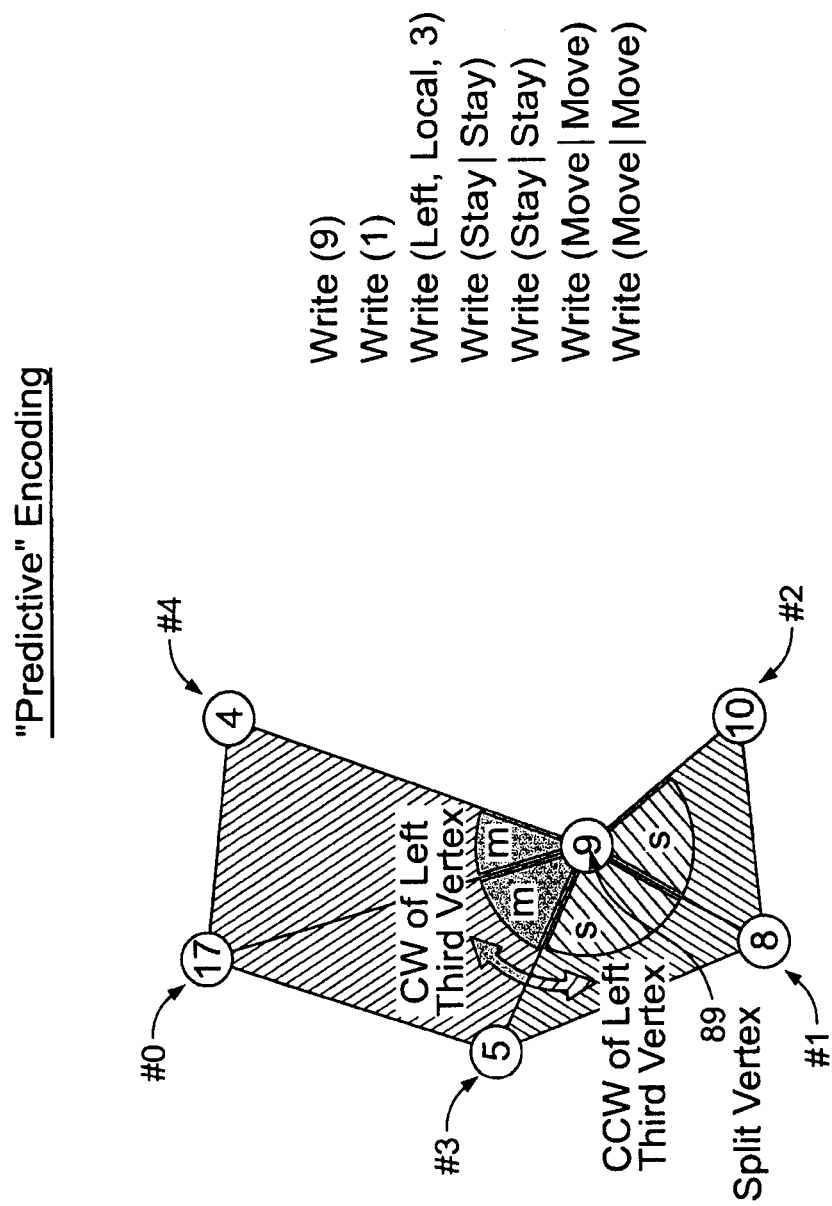
FIG. 27 is a block diagram that includes the non-updated MRM of FIG. 25 and compression code generated by the process of FIG. 26.

FIG. 27 shows the compression code generated by process 87 for the MRM update of FIG. 25. Arithmetic coding may be used to implement the predictions. Local indexing may be used instead of global indexing wherever possible (e.g., whenever a third vertex is a neighbor of the split vertex). The MRM update compression is performed as follows:

(1) WRITE "9" FOR THE GLOBAL INDEX OF THE SPLIT VERTEX. FOR COMPRESSION WE CAN EXPLOIT THE FACT THAT THE INDEX "9" HAS TO BE A NUMBER BETWEEN 0 AND 27.

(2) WRITE "1" FOR THE NUMBER OF NEW FACES (FACE 80 IN FIG. 25)

(3) WRITE "LEFT", "LOCAL", AND "3" FOR THE NEW FACE (DEFINED BY VERTICES 9, 28, 5). FOR COMPRESSION WE CAN EXPLOIT THE FACT THAT THE INDEX "3" HAS TO BE A NUMBER BETWEEN 0 AND 5. NO PREDICTIVE RIGHT/LEFT CODING HERE, BECAUSE THERE IS JUST ONE NEW FACE (4) WALK COUNTERCLOCKWISE FROM THE LEFT THIRD VERTEX—WRITE "STAY" WITH PREDICTION "STAY" (STAY|STAY)

(5) CONTINUE TO WALK COUNTERCLOCKWISE FROM THE LEFT THIRD VERTEX—WRITE "STAY" WITH PREDICTION "STAY" (STAY|STAY)

(6) CANNOT CONTINUE TO WALK COUNTERCLOCKWISE (7) NOT ALL CORNERS CLASSIFIED (8) WALK CLOCKWISE FROM THE LEFT THIRD VERTEX—WRITE "MOVE" WITH PREDICTION "MOVE" (MOVE|MOVE)

(9) CONTINUE TO WALK CLOCKWISE FROM THE LEFT THIRD VERTEX—WRITE "MOVE" WITH PREDICTION "MOVE" (MOVE|MOVE)

(10) CANNOT CONTINUE TO WALK CLOCKWISE

(11) ALL CORNERS CLASSIFIED

Figure 29:
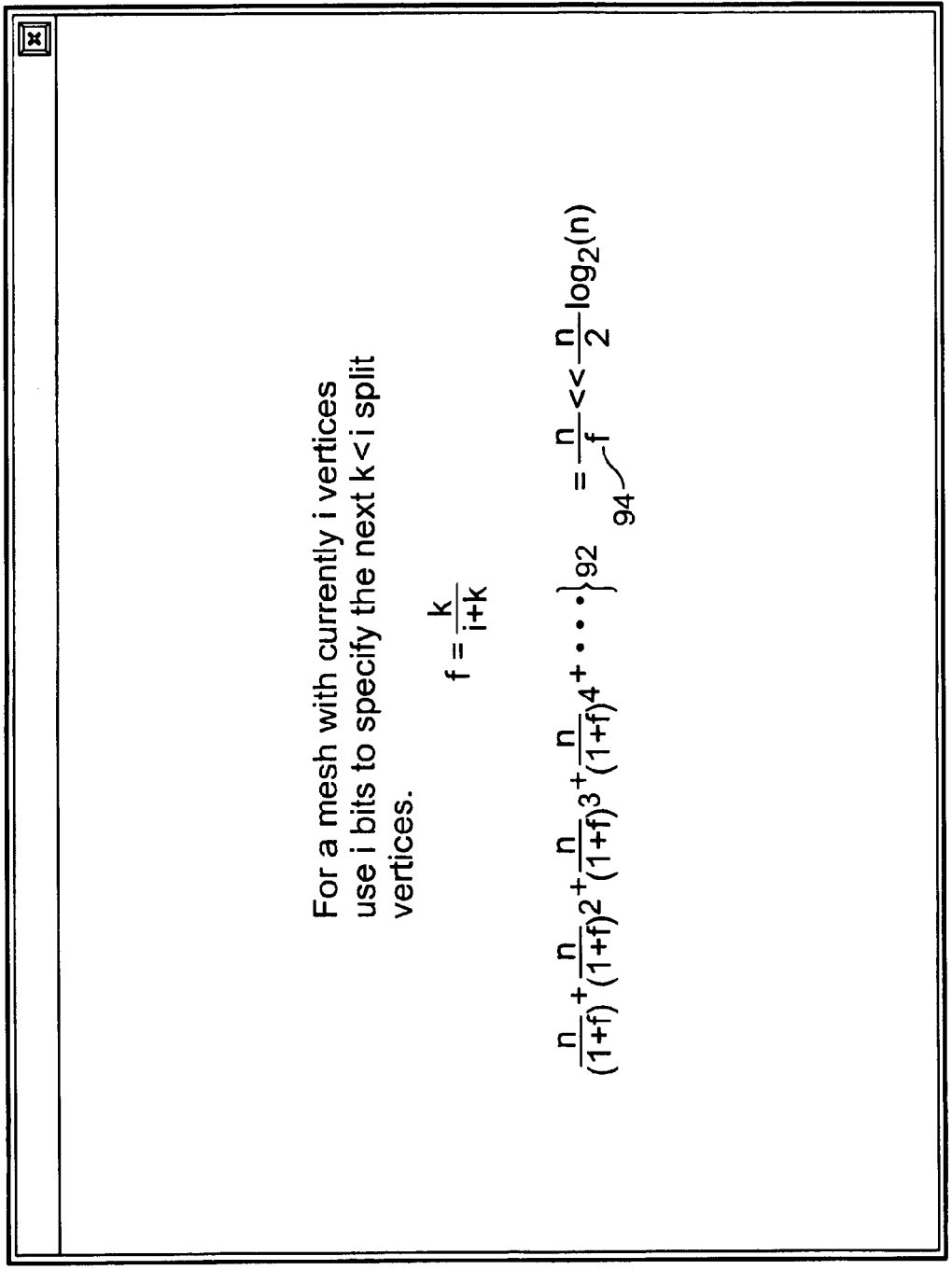
FIG. 29 illustrates that coding costs are lower after slightly constraining an MRM vertex update sequence such that split vertices can be specified in batches.

FIGS. 28 and 29 show how batching of vertex updates into independent sets can improve coding efficiency, since batching allows specification of the split vertices more efficiently. When processing vertex updates independently, log(i−1) bits are required to specify the split vertex of the $i^{th}$ vertex update. For a mesh with n vertices, this sums to a superlinear value (e.g., $n\log_2 n$) for all vertices.

Referring to FIG. 29, the foregoing problem can be addressed by modifying the MRM generator. The vertex updates may be ordered into batches. If k (k>1) vertex updates can be performed on an MRM that currently has i vertices, such that the updates can be executed in the order that their corresponding split vertices appear in the vertex array, then it is possible to encode the mesh more compactly. This is because only i bits are needed to specify the split vertices of all the vertex updates that go from i vertices in the MRM to i+k vertices in the MRM (e.g., a "0" bit means that a vertex is not a split vertex and a "1" bit means that a vertex is a split vertex). Given that the fraction f=k/(i+k) can be kept above a certain threshold, it is possible to calculate the total number of bits using a geometric series 92 whose first element is missing. Using a closed form solution and doing some term re-writing, the sum of the series reduces to equation 94. Thus, only n/f bits may be used to specify all MRM split vertices. This is less than the $n\log_2 n$ bits noted above, especially as n gets large.

Figure 30:
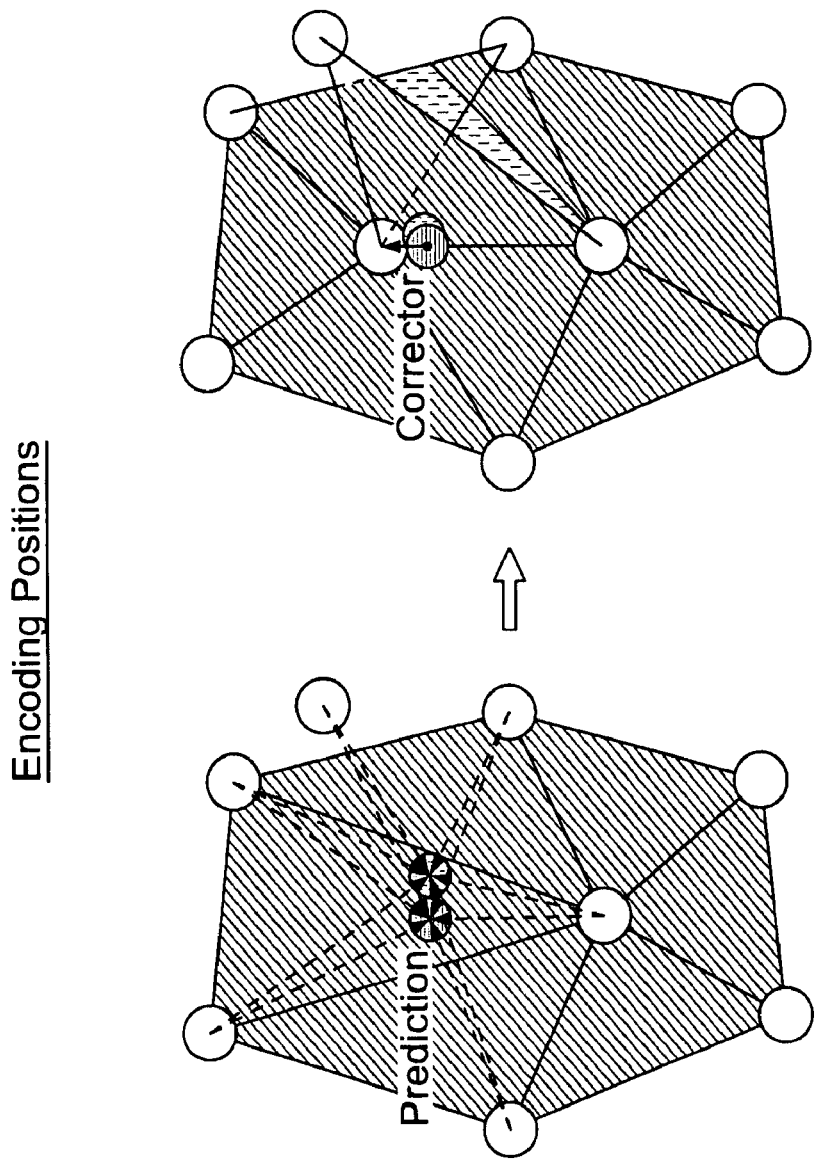
FIG. 30 is a block diagram of a (non-manifold) MRM vertex update that illustrates how vertex positions may be encoded
Figure 31:
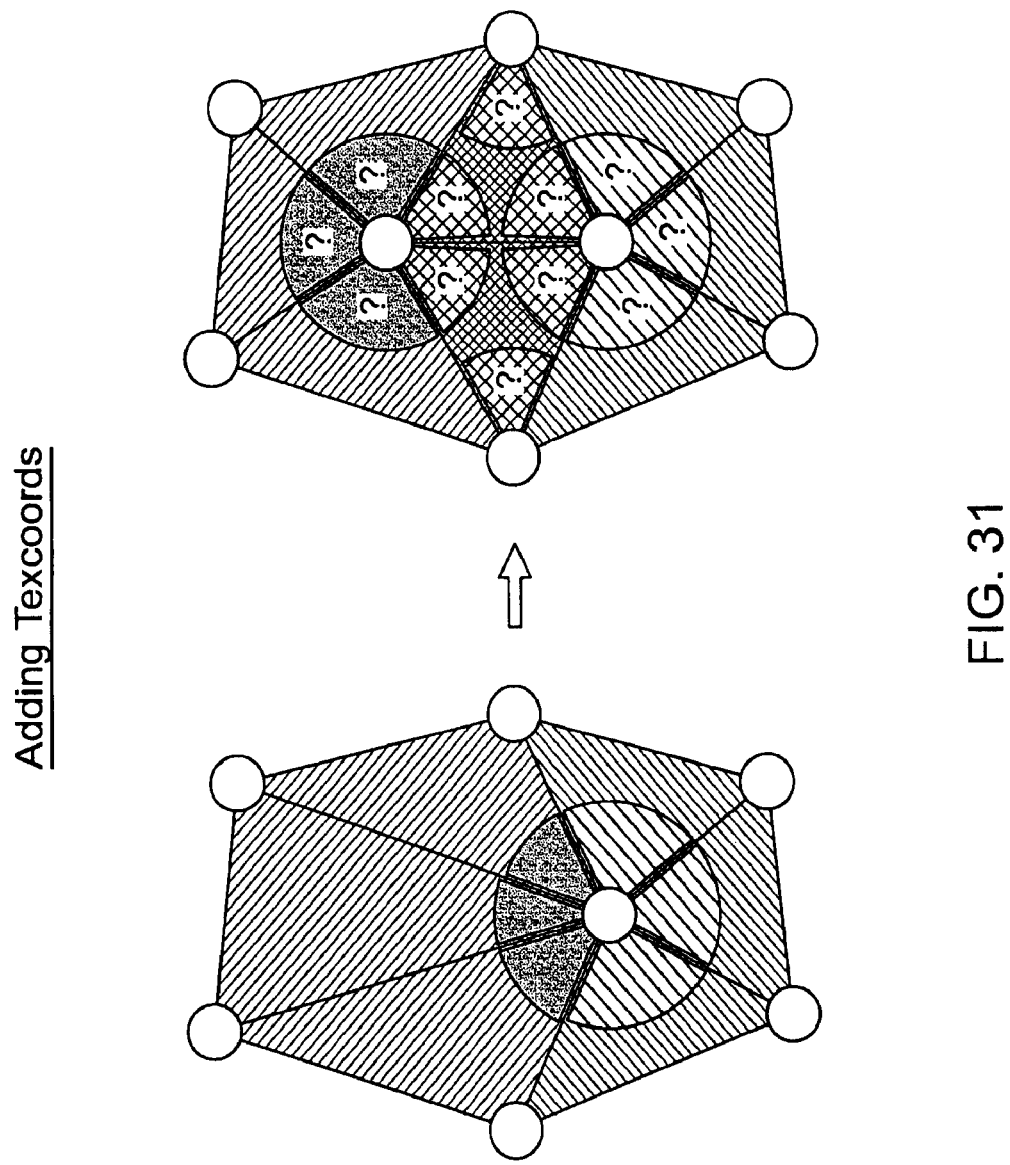
FIG. 31 is a block diagram of an MRM vertex update illustrating corners whose texture coordinates indices are potentially affected by a vertex update.

FIG. 30 shows compression of the 3D position of the vertices using predictive coding. Instead of coding the position of the update vertex directly, the position is predicted based on positions of previously decoded vertices and only a corrective delta value is encoded. If there are no adjacent vertices, the position of the split vertex is used as the prediction. If there is no split vertex, a meaningful prediction generally cannot be made. This is only the case for the position of the first vertex update. In this case, any location may be used so long as the same location is used for the MRM encoder and decoder.

An MRM of a textured mesh also may specify what happens to texture coordinate mapping during a vertex update. In contrast to positions, which are associated with the vertices of the mesh, texture coordinates are associated with the corners of the mesh. The corners around a vertex may all reference the same texture coordinate, but often reference two, three, or four different texture coordinates, and may even all reference a different texture coordinate. A vertex update introduces new corners, namely, the corners of the new faces. The encoding process should specify for these new corners, which texture coordinate they reference. Typically, a vertex update also changes the referenced texture coordinate for some existing corners. The encoding process should specify for which corners this happens and also to which texture coordinate they reference changes.

Each corner of each face of the MRM references its associated texture coordinate with an index into an array of texture coordinates, called a texture coordinate index. The texture coordinates are stored in this array in the order that they are introduced by the vertex updates. This order implicitly determines the index with which they are referenced. A vertex update can introduce none, one, or more texture coordinates. For example, if an $i^{th}$ vertex update of an MRM that already has j texture coordinates introduces two new texture coordinates, then these two new texture coordinates will receive the texture coordinate indices j and j+1 and, afterwards, the MRM has j+2 texture coordinates.

FIGS. 31 to 41 show processes for encoding changes and assignments of references to texture coordinates (referred to in the figures as "texcoords") for the corners that are potentially affected by a vertex update. The question marks in FIG. 31 indicate for which corners such information needs to be encoded. The corners can be classified into four types of corners, which are encoded differently: third corners, moving corners, updated corners, and split corners. The third corners, update corners, and split corners are corners of the new faces. The encoding process specifies which texture coordinate these corners reference. The moving corners and existing corners for which the texture coordinate reference can potentially change. For such corners, the encoding process needs to specify if this indeed happens and, if so, to which texture coordinate their reference changes.

Figure 32:
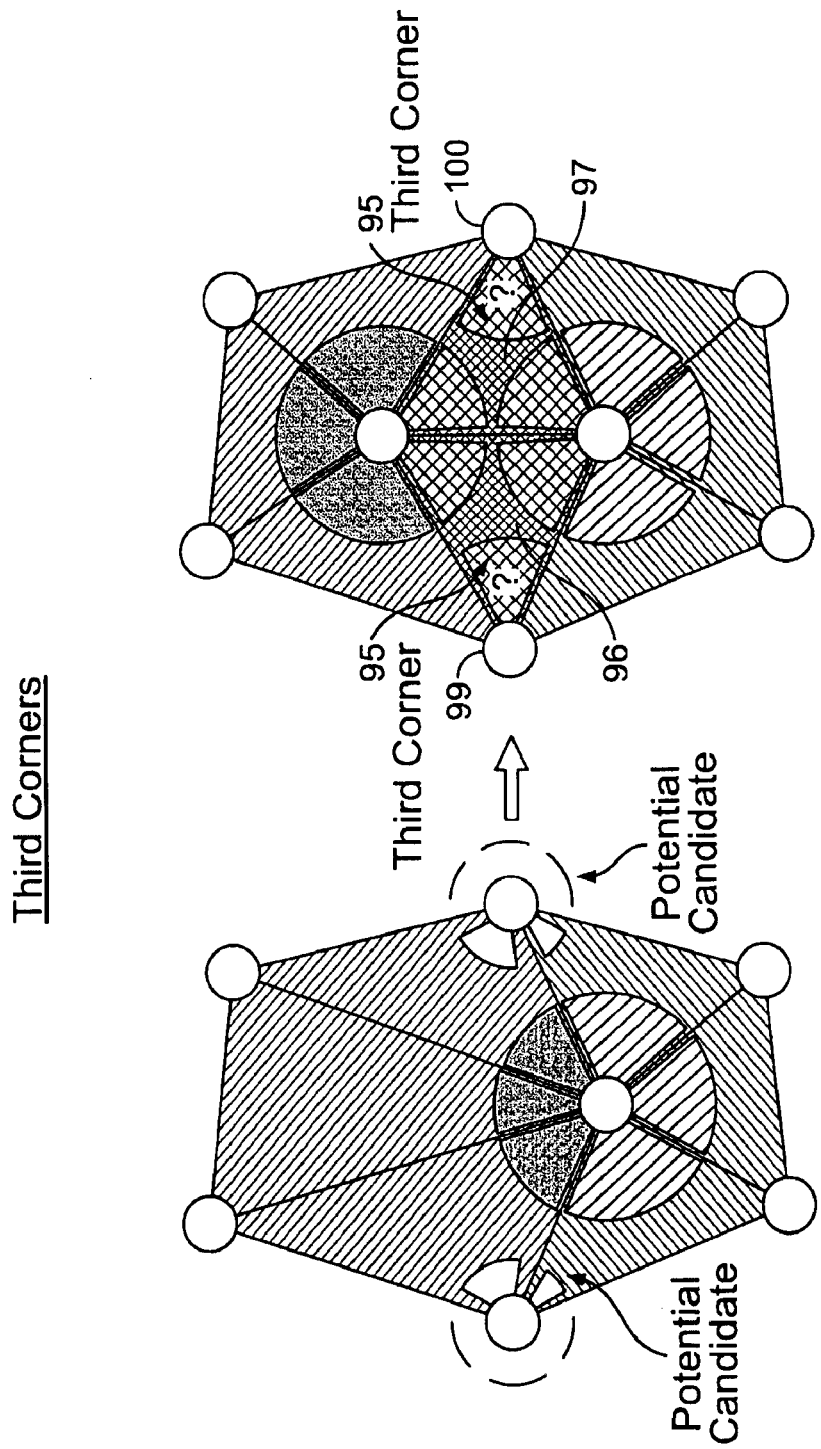
FIG. 32 is a block diagram of an MRM vertex update illustrating which corners are called third corners and how their associated texture coordinate indices are potentially affected by a vertex update.

Referring to FIG. 32, third corners 95 are defined as corners of new faces 96, 97 that connect to third vertices 99 and 100 respectively. The texture coordinate index for a third corner is often found in a list of candidate texture coordinate indices. This list of candidates contains all texture coordinate indices that are currently found around the respective third vertex. If the texture coordinate index of the third corner is not in this list, it is usually a new texture coordinate index (e.g. this is the first time the referenced texture coordinate is used). Only in rare cases does it reference an old texture coordinate that is already used somewhere else in the mesh.

Figure 33:
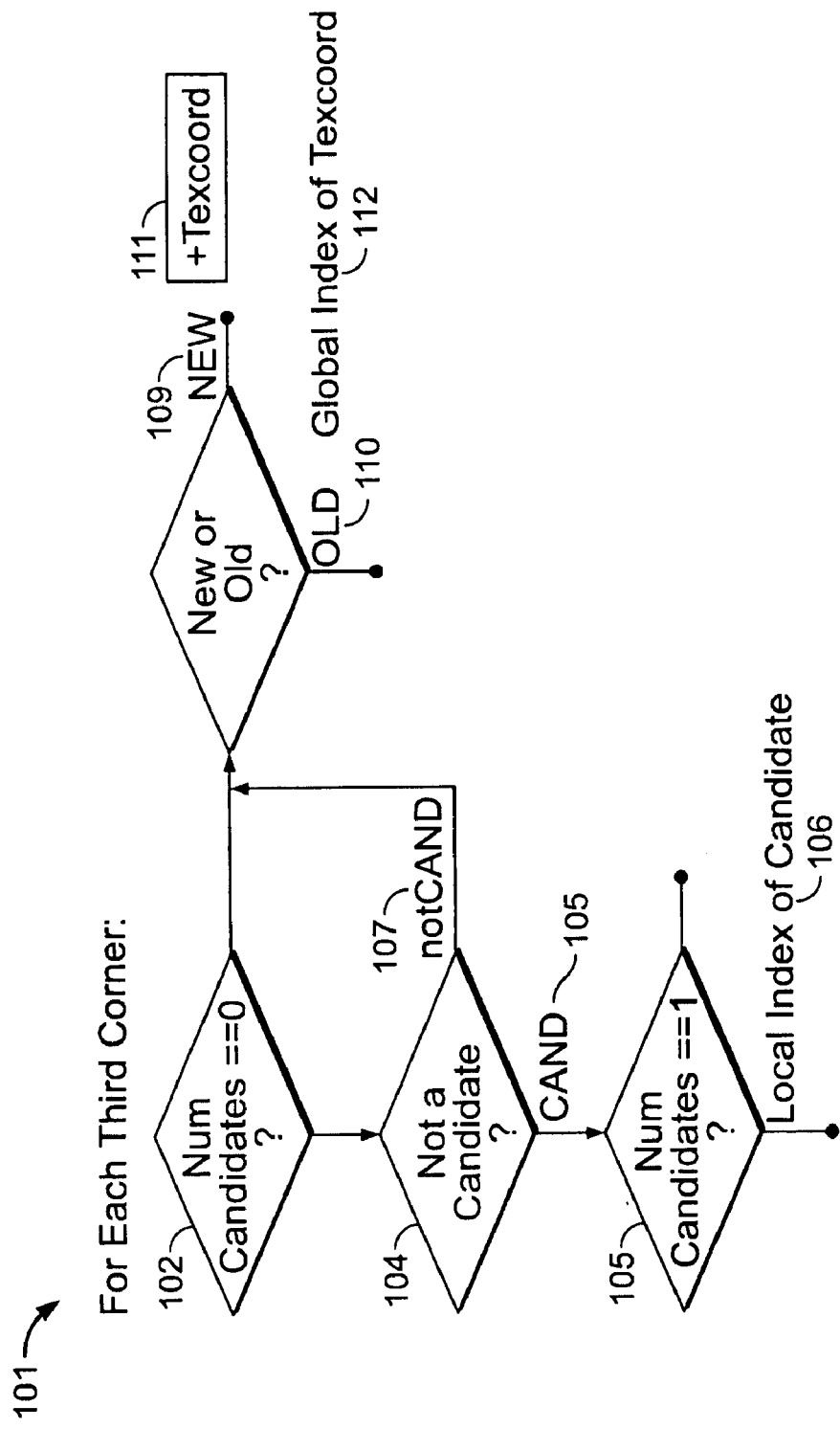
FIG. 33 is a flow chart of a process for encoding how the texture coordinate indices associated with third corners are affected by a vertex update.

FIG. 33 shows a flowchart of a process 101 for encoding which texture coordinate index is given to a third corner 95 (FIG. 32). Representative pseudocode to implement the flowchart of FIG. 33 is shown in Appendix A.

Process 101 iterates (102) over third corners and classifies (104) them as either CAND (105) of notCAND (107), depending on whether or not the texture coordinate index of the third corner is in its respective list of candidates. If the list of candidates is empty, this classification can be omitted, since it has to be a notCAND. If the third corner was classified as CAND (105), process 101 stores (106) the local index that its texture coordinate index has in the list of candidates. The index can be omitted if the list has only one candidate. If the third corner was classified as notCAND (107), process 101 stores an indication (NEW) that the texture coordinate index of the third corner references a new texture coordinate (109) or an indication (OLD) that it references an old texture coordinate (110). If a new texture coordinate is referenced, process 101 increments the current counter of texture coordinate indices and assigns it to the third corner. In this case, process 101 may encode the UV coordinates of the texture coordinate (111) using some kind of predictive coding or any other method. Otherwise (this is typically a very rare case), process 101 stores the global index (112) of the referenced texture coordinate. This is a number between 0 and the current counter of texture coordinate indices.

Figure 34:
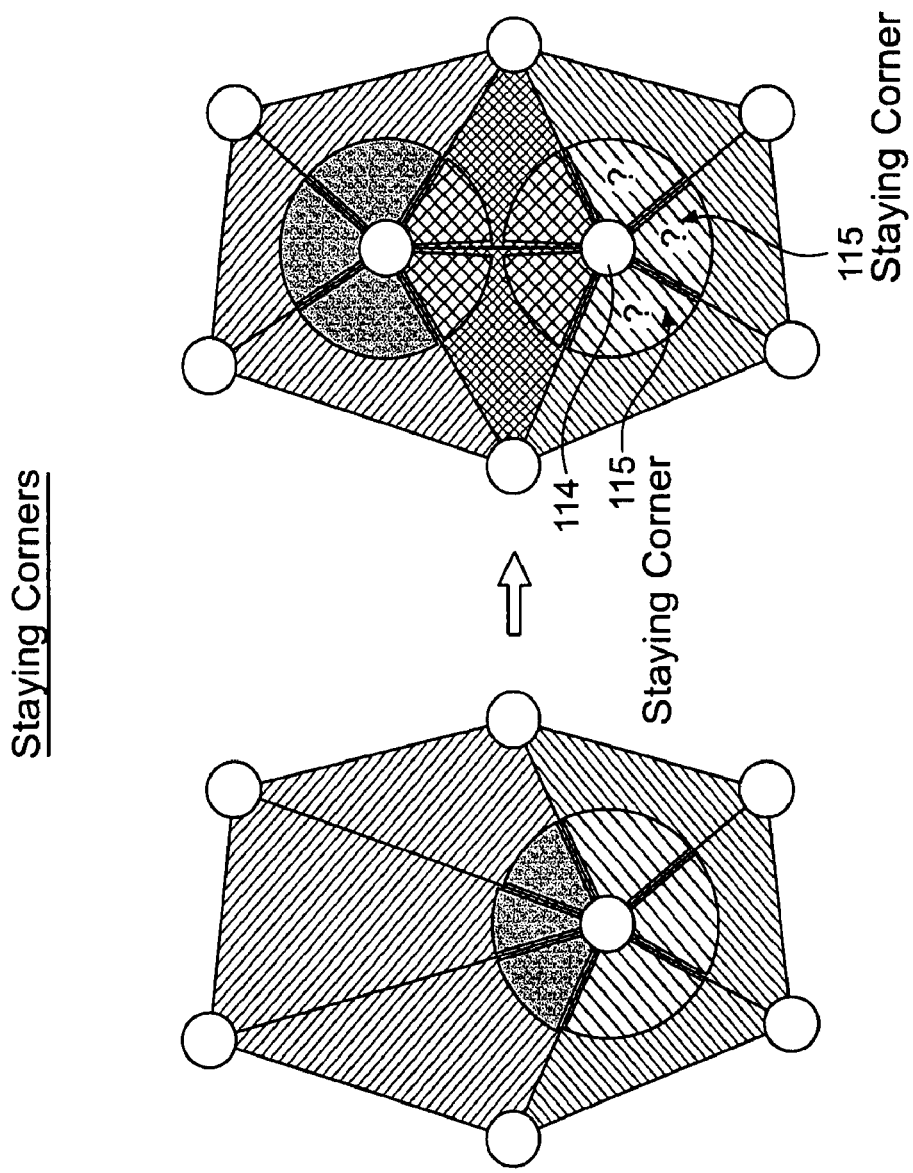
FIG. 34 is a block diagram of an MRM vertex update illustrating which corners are called staying corners whose associated texture coordinate indices are not affected by a vertex update.

Referring to FIG. 34, the corners around the split vertex 114 that DO NOT move from the split vertex 114 to the update vertex 117 are called staying corners 115. They already have a texture coordinate index (e.g., reference a texture coordinate), which is not affected by the vertex update.

Figure 35:
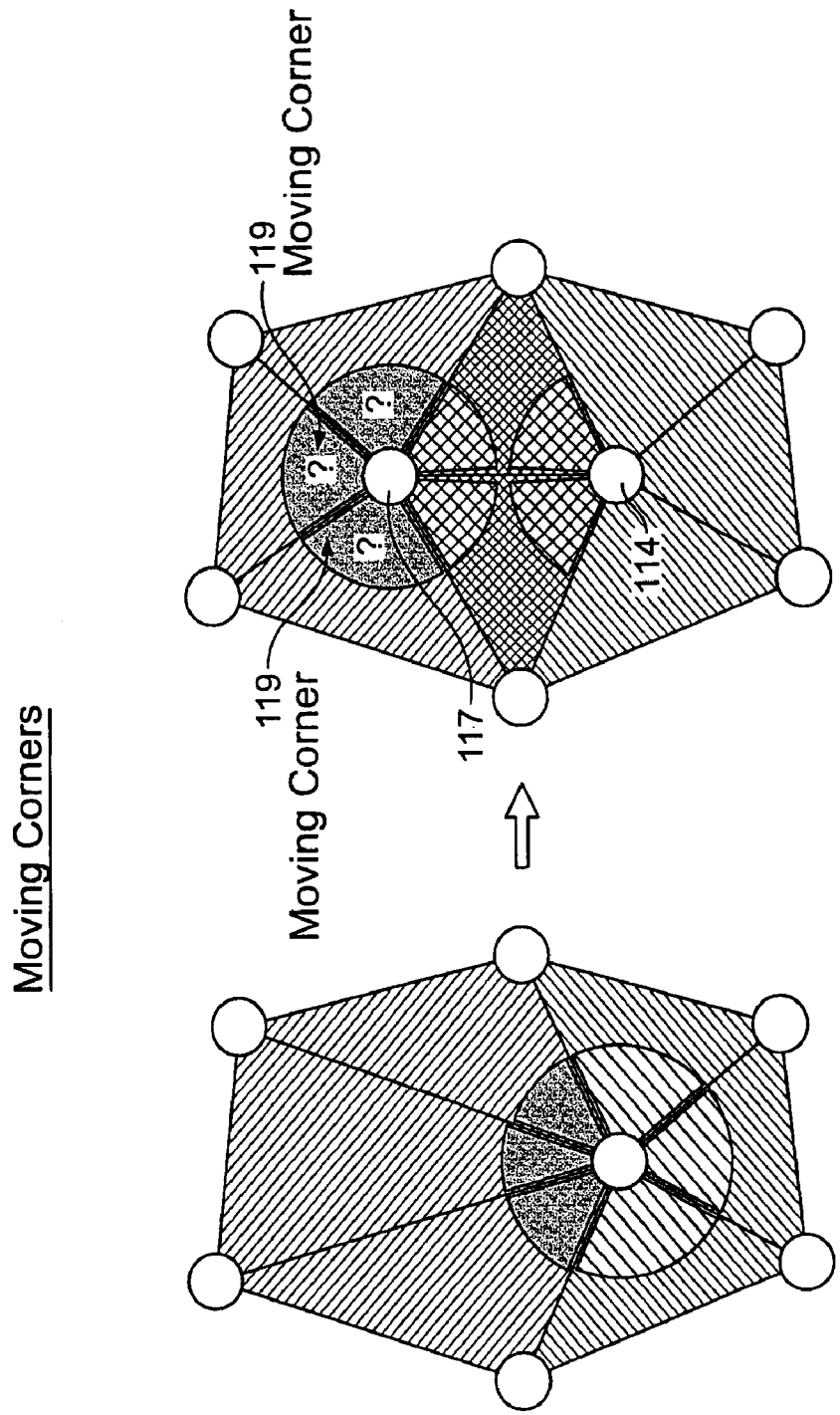
FIG. 35 is a block diagram of an MRM vertex update illustrating which corners are called moving corners.

Referring to FIG. 35, the corners around the split vertex 114 that move from the split vertex 114 to update vertex 117 are called moving corners 119. They already have a texture coordinate index that can potentially change. It is beneficial to encode these changes in terms of moving texture coordinate indices rather than in terms of moving corners.

Figure 36:
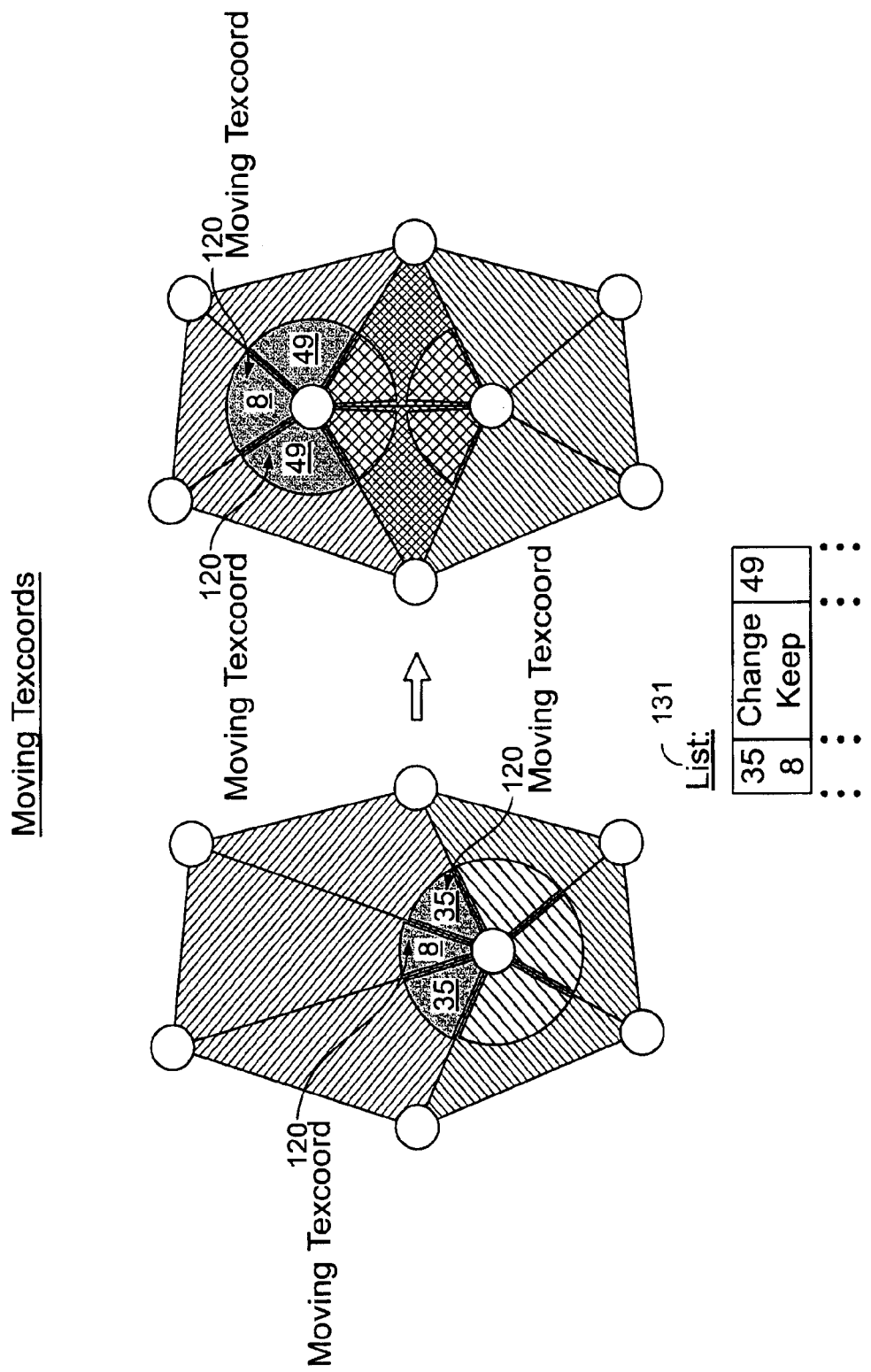
FIG. 36 is a block diagram of an MRM vertex update illustrating that the texture coordinate indices associated with moving corners can be treated in terms of moving texture coordinates.

Referring to FIG. 36, the moving texture coordinate indices 120 are the set of texture coordinate indices that are associated with moving corners 119 prior to the vertex update.

Figure 37:
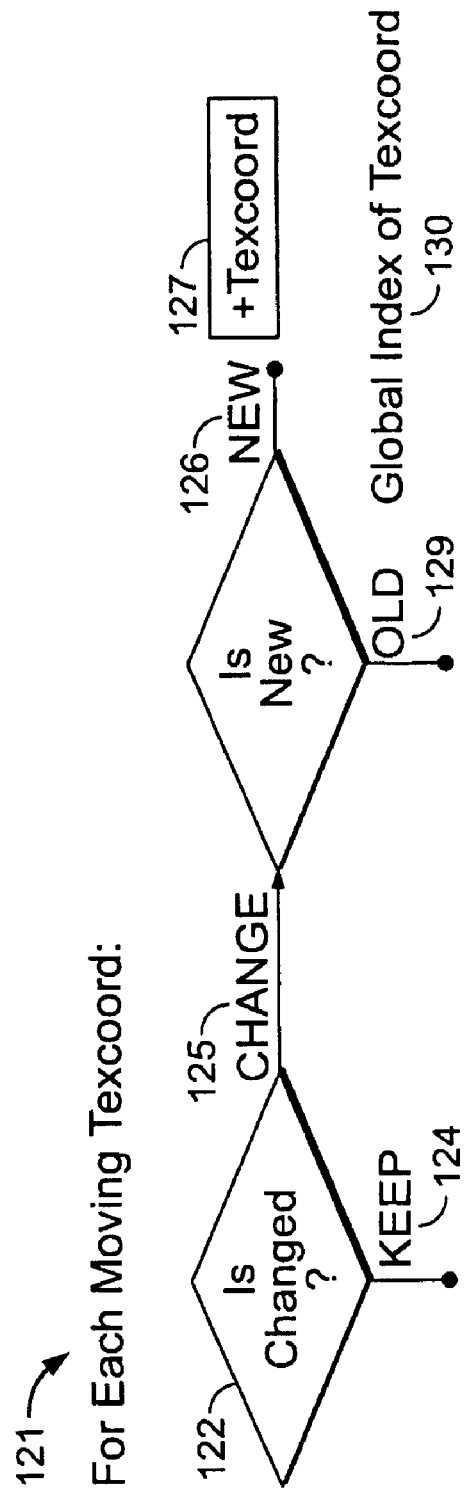
FIG. 37 is a flow chart of a process for encoding how the moving texture coordinates are affected by the vertex update.

FIG. 37 shows a flowchart of a process 121 for encoding texture coordinates of moving corners 119 (FIG. 35). Representative pseudocode to implement the flowchart of FIG. 37 is shown in Appendix B.

Process 121 (FIG. 37) classifies (122) the moving texture coordinate indices 120 as either CHANGE or KEEP, depending on whether or not this texture coordinate index changes during the vertex update. If a moving texture coordinate index is classified as KEEP (124), it does not change. If a moving texture coordinate 119 is classified as CHANGE (125), it usually changes to a new texture coordinate index (126) (e.g. this is the first time the referenced texture coordinate is used). In this case, process 121 stores an indication (NEW), increments the current counter of texture coordinate indices, and assigns it to all moving corners 119 that share this moving texture coordinate index 120. In this case, process 101 may encode the UV coordinates of the texture coordinate (127) using some kind of predictive coding or any other method. Only in rare cases does the moving texture coordinate change to an old texture coordinate index that is already used somewhere else in the mesh (129). In this case, process 121 stores an indication (OLD), stores the global index (130) of the referenced texture coordinate, and assigns it to all moving corners 119 that share this moving texture coordinate index 120. This is a number between 0 and the current count of texture coordinate indices.

Process 121 (FIG. 37) performs the classification of CHANGE or KEEP per moving texture coordinate index 120 rather than per moving corner 119. That is, if the texture coordinate index of some moving corner is A and the texture coordinate index is updated to B, then the texture coordinate indices of all moving corners that are A are updated to B. Likewise, if the texture coordinate index of some moving corner is A and it is not updated, then the texture coordinate indices of all moving corners that are A are also not updated.

In the example of FIG. 36, process 121 enters all moving texture coordinate indices into a list 131. In this example, there are two moving texture coordinate indices, namely "35", which is used by two moving corners, and "8", which is used by one moving corner. Process 121 classifies the moving texture coordinate index "35" as CHANGE. Since it will reference a new texture coordinate, process 121 stores an indication (NEW), increments the current counter of texture coordinate indices to "49", and assigns the texture coordinate to all moving corners with a texture coordinate index of "35". Process 121 classifies the moving texture coordinate index "8" as KEEP. Hence, all moving corners with a texture coordinate index of "8" remain unchanged. There can be at most as many CHANGE classifications as there are new faces introduced by the vertex update. If there have already been that many, process 121 defaults the classification of the remaining moving texture coordinate indices to KEEP.

Figure 38:
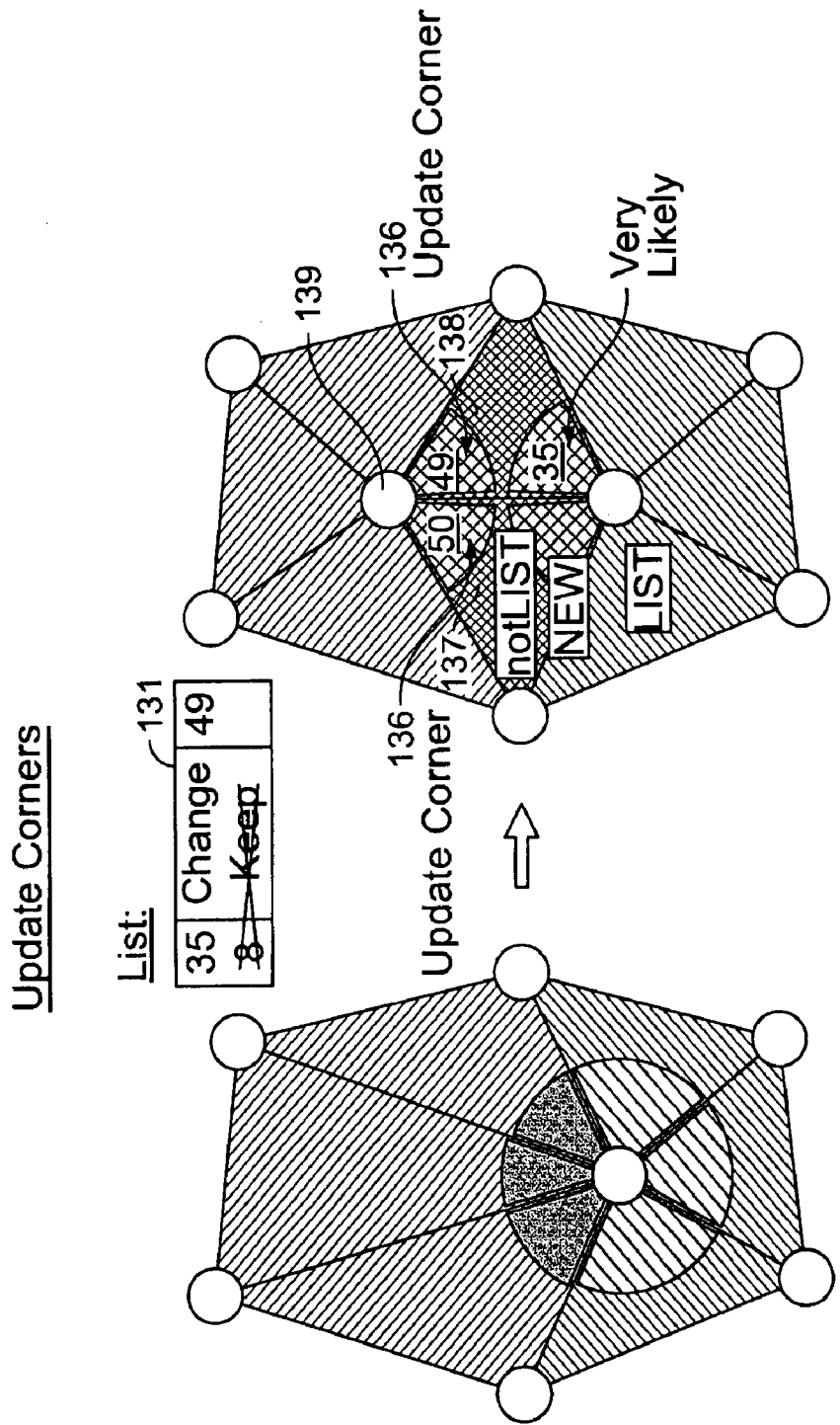
FIG. 38 is a block diagram of an MRM vertex update illustrating which corners are called update corners and how their associated texture coordinate indices are potentially affected by a vertex update.
Figure 39:
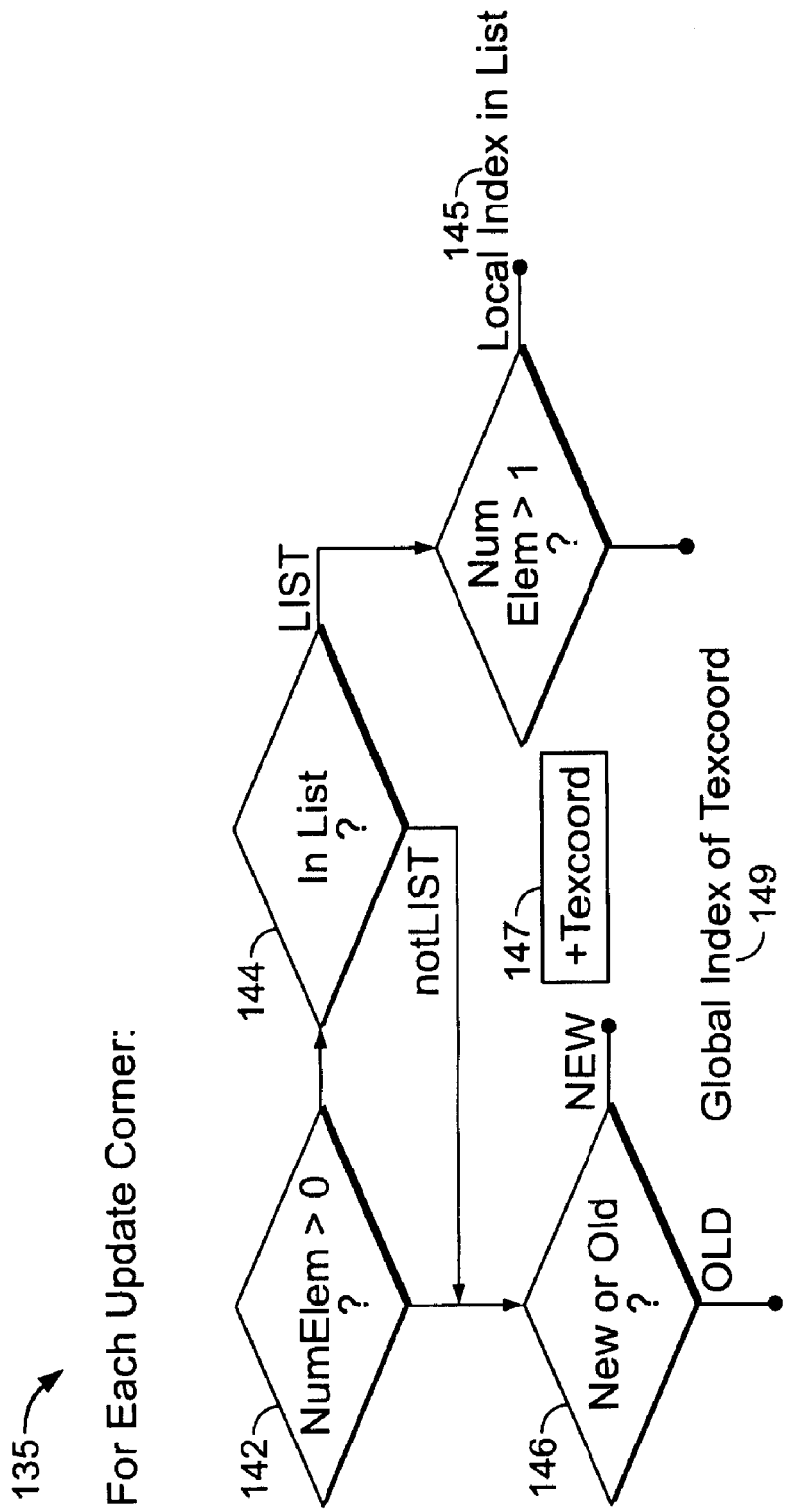
FIG. 39 is a flow chart of a process for encoding how the texture coordinate indices associated with update corners are affected by a vertex update.

Referring to FIG. 38, the corners of new faces 137, 138 that connect to the update vertex 139 are called update corners 136. FIG. 39 shows a flowchart of a process 135 for encoding the assignment of texture coordinate indices to update corners 136 (FIG. 38). Representative pseudocode to implement the flowchart of FIG. 39 is shown in Appendix C.

Process 135 (FIG. 39) classifies (144) update corners as LIST or notLIST depending on whether or not its future texture coordinate index is among those that were generated during the encoding of the moving texture coordinate indices (e.g. whether they appear in the right column of the generated list 131). If no moving texture coordinate indices were changed (FIG. 37, 125) during encoding of the moving texture coordinate indices (e.g. in case the right column of the generated list 131 (FIG. 38) is empty), process 121 does not store this classification explicitly, but defaults (142) the classification of the update corners to notLIST. But, process 135 indexes each list entry at least once. When the number of not-yet-indexed list entries equals the number of unprocessed update corners, the classification of all remaining update corners defaults (144) to LIST.

If the update corner was classified as LIST, process 135 stores (145) the local index of its texture coordinate index in the list. The index can be omitted if the list has only one entry. This index can also be omitted when the last update corner is processed and the list still has one not-yet-indexed entry.

If the update corner was classified as notLIST, process 135 stores usually (146) an indication (NEW) that the texture coordinate index of the update corner references a new texture coordinate (147) or sometimes an indication (OLD) that it references an old texture coordinate. In most cases a new texture coordinate is referenced, in which case process 135 increments the current counter of texture coordinate indices and assigns it to the updated corner. In this case, process 101 may encode the UV coordinates of the texture coordinate (127) using some kind of predictive coding or any other method. Otherwise (this is typically a rare case), process 135 stores the global index (149) of the referenced texture coordinate. This is a number between 0 and the current count of texture coordinate indices.

In the example of FIG. 38 the first of the two update corners has a texture coordinate index of "49" that is in the list. Process 135 classifies it as LIST. Since there is only one entry in the right column of list 131, no local index is necessary. The second update corner references a texture coordinate that is not in the list. Process 135 classifies it as notLIST and also stores (146) an indication (NEW) that the texture coordinate index of the update corner references a new texture coordinate. Thus, process 135 increments the current counter of texture coordinate indices to "50", and assigns it to this update corner.

Figure 40:
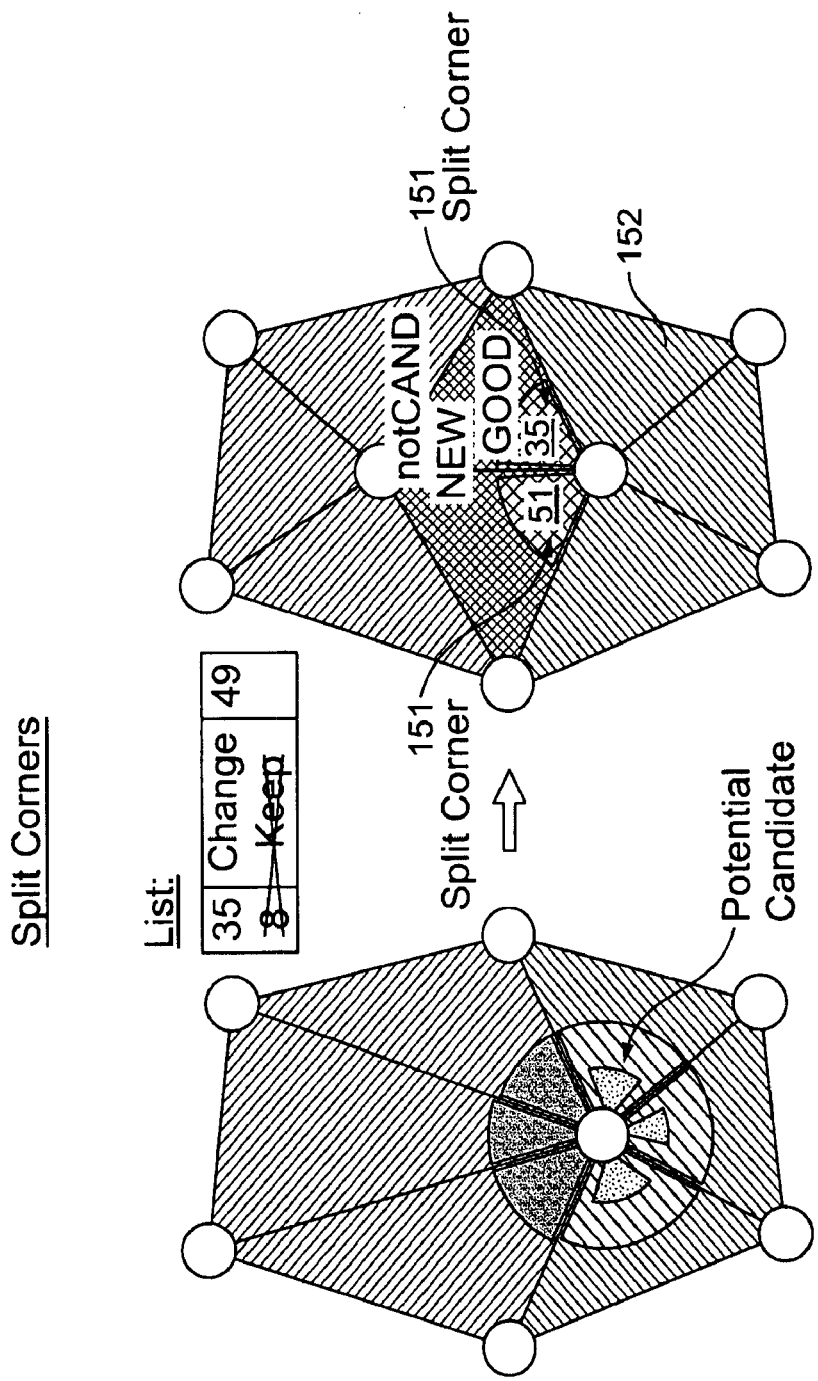
FIG. 40 is a block diagram of an MRM vertex update illustrating which corners are called split corners and how their associated texture coordinate indices are potentially affected by a vertex update.

Referring to FIG. 40, the corners of new faces that connect to the split vertex 152 are called split corners 151.

Figure 41:
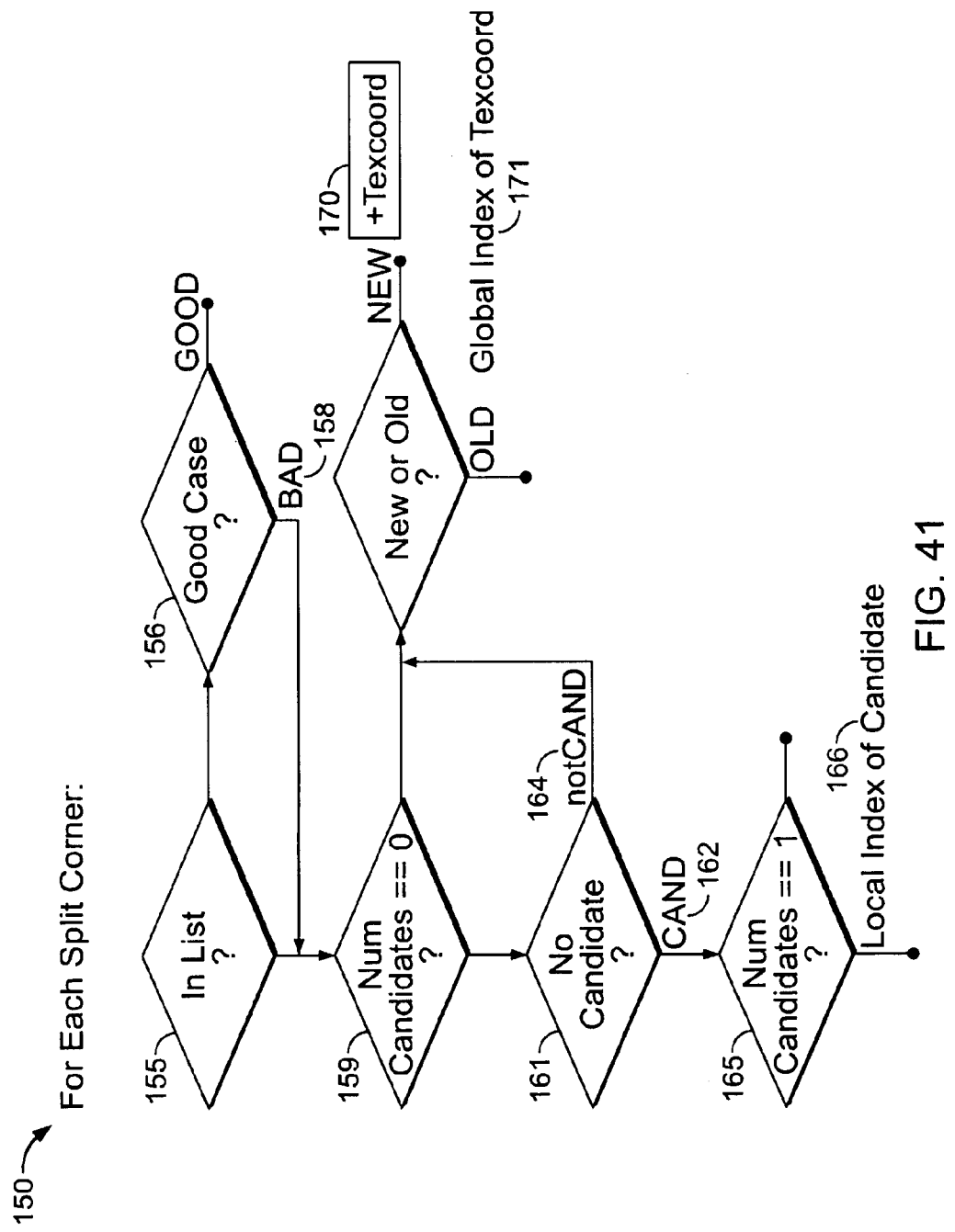
FIG. 41 is a flow chart of a process for encoding how texture coordinate indices associated with split corners are affected by a vertex update.

FIG. 41 shows a flowchart of a process 150 for encoding the assignment of texture coordinate indices to split corners 151 (FIG. 40). Representative pseudocode to implement the flowchart of FIG. 41 is shown in Appendix D.

Process 150 loops over the split corners to encode which texture coordinates are referenced. Process 150 determines (155) if the update corner corresponding to the currently processed split corner (e.g. the update corner from the same face) is in the right column of the list 131 (see also FIG. 37) generated during process 121 (FIG. 38). If so, then the split corner is very likely to get the texture coordinate index from the left column of the same row. This is usually the case and process 150 writes GOOD (156) and assigns this texture coordinate to the currently processed split corner. Otherwise process 150 writes BAD (158) and continues.

The referenced texture coordinate might then have an index that is among a list of candidates. This candidate list is made up from the texture coordinate indices of the staying corners, all texture coordinate indices that are in the left column of a CHANGE entry in the list 131 (FIG. 37) generated during process 121 (FIG. 38), and any texture coordinate index assigned to an already processed split corner. If there is no such candidate (159), the referenced texture coordinate is usually a NEW texture coordinate, but sometimes an OLD texture coordinate (160). Otherwise process 150 indicates (161) if the texture coordinate referenced by the split corner is among the candidate of the list (CAND) (162) or not (notCAND) (164). If the texture coordinate index is among the candidates (162) and there is more than one candidate (165), process 150 writes (166) its local index within the candidate list. If the texture coordinate index is not among the candidates (164), the referenced texture coordinate is usually a NEW texture coordinate, but sometimes an OLD texture coordinate (160). If the referenced texture coordinate is classified as OLD, the texture coordinate index is recorded. The number recorded is between 0 and the current count of texture coordinate indices.

In the example if FIG. 41 there are two split corners. The corresponding update corner of the split corner processed first is in the list (namely "49"). Since the split corner is supposed to get the texture coordinate index from the left column of the same row in this list (namely "35"), process 150 writes GOOD. Process 150 determines that the corresponding update corner of the second split corner is not in the list. Process 150 determines that it is also not a candidate, writes notCAND, and stores an indication (NEW) that the texture coordinate index of the split corner references a new texture coordinate. Thus, process 150 increments the current counter of texture coordinate indices to "51", and assigns it to this split corner.

It should be noted that every texture coordinate index from the left column of a CHANGE entry in the list 131 (FIG. 37) generated during process 121 (FIG. 38) is assigned at least once to a split corner. This can be exploited by process 150 to sometimes infer a GOOD case.

Figure 42:
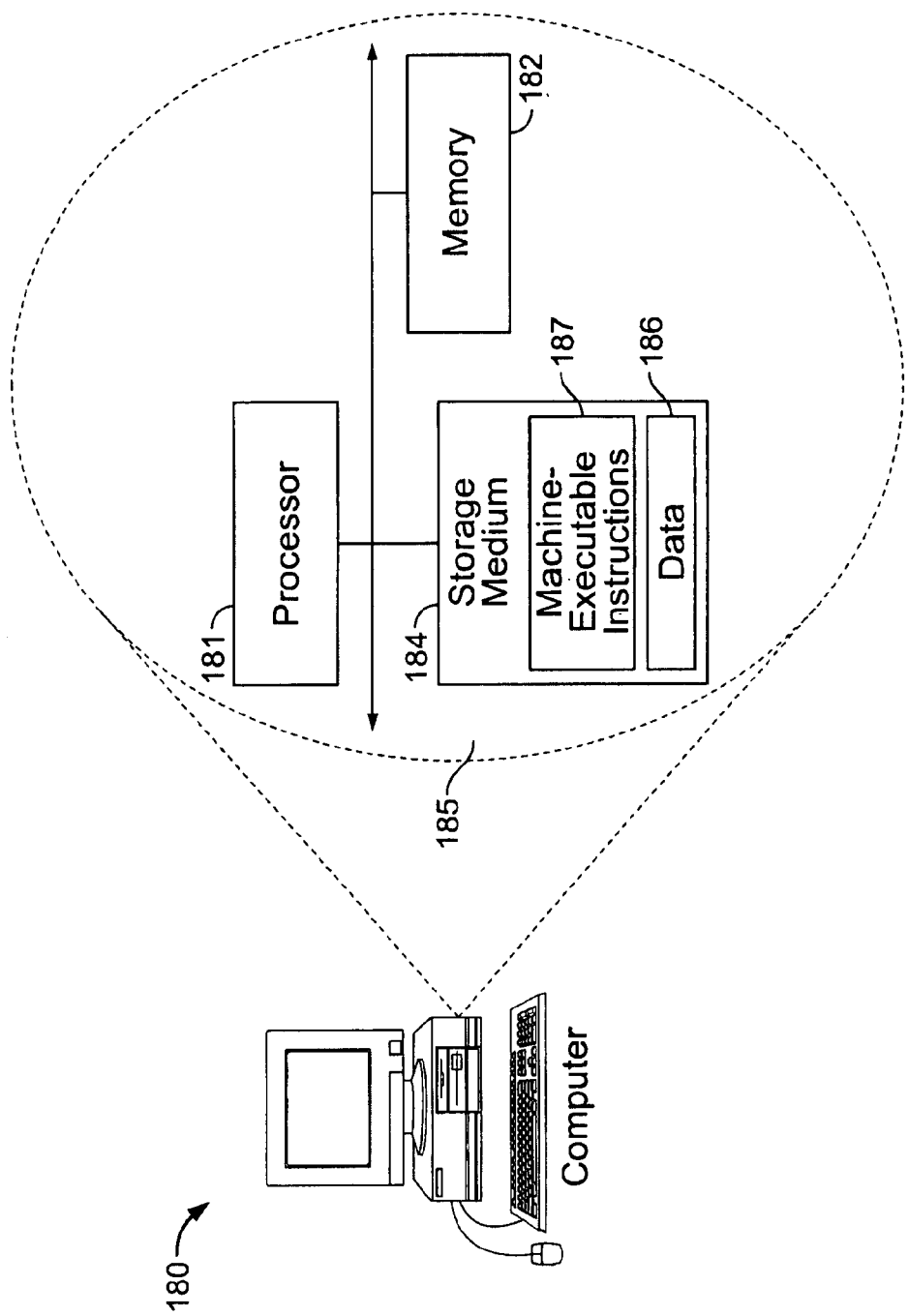
FIG. 42 is a block diagram of computer hardware on which the MRM encoding processes described with respect to FIGS. 1 to 41 may be implemented.

FIG. 42 shows a computer 180 on which the MRM update encoding processes described herein may be implemented. Computer 180 includes a processor 181, a memory 182, and a storage medium 184 (see view 185). Storage medium 184 stores data 186 for one or more MRMs and machine-executable instructions 187 that are executed by processor 181 out of memory 182 to perform one or more of the various MRM update encoding processes described herein.

The MRM update encoding processes described herein are not limited to use with the hardware and software described above; they may find applicability in any computing or processing environment. The processes may be implemented in hardware, software, or a combination of the two. For example, the processes may be implemented in an encoder that includes circuitry, such as one or more of programmable logic (e.g., an ASIC), logic gates, a processor, and a memory. The inverse of the MRM update encoding processes may be performed in a decoder that includes similar circuitry.

The processes may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the processes. The processes may also be implemented as a machine-readable storage medium, configured with a computer program, where, upon execution, instructions in the computer program cause a machine to operate in accordance with the processes.

Embodiments of the processes may be used in a variety of applications. Although the processes are not limited in this respect, the processes may be used with memory devices in microcontrollers, general purpose microprocessors, digital signal processors (DSPs), reduced instruction-set computing (RISC), and complex instruction-set computing (CISC), among other electronic components. However, it should be understood that the processes are not limited to use with these examples.

Embodiments of the processes may also be included in integrated circuit blocks referred to as core memory, cache memory, or other types of memory that store electronic instructions to be executed by a microprocessor or store data that may be used in arithmetic operations.

The claims are not limited to the embodiments described herein. For example, the processes described herein can be used on meshes other than MRMs. The processes can be used on vertex updates other than, and in addition to, those shown.

What is claimed is:

1. A method of encoding an update of a polygon mesh having at least one target vertex, comprising:

defining a local index of a vertex that neighbors the target vertex, the local index defining a position of the vertex relative to the target vertex; and encoding the mesh using the local index, the encoding comprising storing the local index of the vertex; and storing a global index of the target vertex, the global index defining the position of the vertex relative to a pre-defined array.

2. The method of claim 1, further comprising:

storing an indication that the mesh is manifold.

3. The method of claim 1, wherein encoding comprises:

storing an identity of a face of the mesh using the local index; and storing a movement status of a corner of a polygon adjacent to the target vertex.

4. The method of claim 3, wherein storing the identity of the face comprises:
   storing an orientation of the face relative to the target vertex;
   storing an index indicator which indicates how the face is indexed; and
   storing an index number for the face.

5. The method of claim 4, wherein:
   the orientation comprises "right" or "left";
   the index indicator comprises "global" or "local"; and
   the index number comprises the global index corresponding to a third corner of the face or the local index corresponding to the third corner of the face.

6. The method of claim 3, wherein the movement status includes a predicted movement status.

7. The method of claim 1, further comprising:
   encoding a texture coordinate for a corner of a polygon affected by the update.

8. The method of claim 7, wherein encoding of the texture coordinate is performed based on a location of the corner relative to the target vertex.

9. The method of claim 7, wherein encoding the texture coordinate comprises:
   determining if the corner is on a list of candidates for texture coordinates; and
   storing a texture coordinate for the corner based on whether the corner is on the list.

10. The method of claim 7, wherein encoding the texture coordinate comprises:
    determining if the texture coordinate of the corner has changed resulting from the update; and
    storing a texture coordinate for the corner based on whether the texture coordinate has changed.

11. A method of encoding an update of a polygon mesh having at least one target vertex, comprising:
    defining a local index of a vertex that neighbors the target vertex, the local index defining a position of the vertex relative to the target vertex;
    storing a global index of the target vertex, the global index defining the position of the vertex relative to a pre-defined array;
    storing a number of new faces resulting from the update;
    storing an identity of a face of the mesh using the local index; and
    storing a movement status of a corner of a polygon adjacent to the target vertex.

12. The method of claim 11, further comprising:
    encoding a texture coordinate for a corner of a polygon affected by the update.

13. The method of claim 12, wherein encoding of the texture coordinate is performed based on a location of the corner relative to the target vertex.

14. An article comprising a machine-readable medium that stores executable instructions to encode an update of a polygon mesh having at least one target vertex, the instructions causing a machine to:
    define a local index of a vertex that neighbors the target vertex; and
    encode the mesh using the local index, the encoding comprising
       storing the local index of the vertex, the local index defining a position of the vertex relative to the target vertex; and
       storing a global index of the target vertex, the global index defining the position of the vertex relative to a pre-defined array.

15. The article of claim 14, further comprising instructions that cause the machine to:
    store an indication that the mesh is manifold.

16. The article of claim 14, wherein encoding comprises:
    storing an identity of a face of the mesh using the local index; and
    storing a movement status of a corner of a polygon adjacent to the target vertex.

17. The article of claim 16, wherein storing the identity of the face comprises:
    storing an orientation of the face relative to the target vertex;
    storing an index indicator which indicates how the face is indexed; and
    storing an index number for the face.

18. The article of claim 17, wherein:
    the orientation comprises "right" or "left";
    the index indicator comprises "global" or "local"; and
    the index number comprises the global index corresponding to a third corner of the face or the local index corresponding to the third corner of the face.

19. The article of claim 16, wherein the movement status includes a predicted movement status.

20. The article of claim 14, further comprising instructions that cause the machine to:
    encode a texture coordinate for a corner of a polygon affected by the update.

21. The article of claim 20, wherein encoding of the texture coordinate is performed based on a location of the corner relative to the target vertex.

22. The article of claim 20, wherein encoding the texture coordinate comprises:
    determining if the corner is on a list of candidates for texture coordinates; and
    storing a texture coordinate for the corner based on whether the corner is on the list.

23. The article of claim 20, wherein encoding the texture coordinate comprises:
    determining if the texture coordinate of the corner has changed resulting from the update; and
    storing a texture coordinate for the corner based on whether the texture coordinate has changed.

24. An article comprising a machine-readable medium that stores executable instructions to encode an update of a polygon mesh having at least one target vertex, the instructions causing a machine to:
    define a local index of a vertex that neighbors the target vertex, the local index defining a position of the vertex relative to the target vertex;
    store a global index of the target vertex, the global index defining the position of the vertex relative to a pre-defined array;
    store a number of new faces resulting from the update;
    store an identity of a face of the mesh using the local index; and
    store a movement status of a corner of a polygon adjacent to the target vertex.

25. The article of claim 24, further comprising instructions that cause the machine to:
    encode a texture coordinate for a corner of a polygon affected by the update.

26. The article of claim 25, wherein encoding of the texture coordinate is performed based on a location of the corner relative to the target vertex.

27. An apparatus to encode an update of a polygon mesh having at least one target vertex, the apparatus comprising circuitry to:

define a local index of a vertex that neighbors the target vertex; and encode the mesh using the local index, the encoding comprising storing the local index of the vertex, the local index defining a position of the vertex relative to the target vertex; and storing a global index of the target vertex, the global index defining the position of the vertex relative to a pre-defined array.

28. The apparatus of claim 27, wherein the circuitry stores an indication that the mesh is manifold.

29. The apparatus of claim 27, wherein encoding comprises:

storing an identity of a face of the mesh using the local index; and storing a movement status of a corner of a polygon adjacent to the target vertex.

30. The apparatus of claim 29, wherein storing the identity of the face comprises:

storing an orientation of the face relative to the target vertex;

storing an index indicator which indicates how the face is indexed; and storing an index number for the face.

31. The apparatus of claim 30, wherein:

the orientation comprises "right" or "left";

the index indicator comprises "global" or "local"; and the index number comprises the global index corresponding to a third corner of the face or the local index corresponding to the third corner of the face.

32. The apparatus of claim 29, wherein the movement status includes a predicted movement status.

33. The apparatus of claim 27, wherein the circuitry encodes a texture coordinate for a corner of a polygon affected by the update.

34. The apparatus of claim 33, wherein encoding of the texture coordinate is performed based on a location of the corner relative to the target vertex.

35. The apparatus of claim 33, wherein encoding the texture coordinate comprises:

determining if the corner is on a list of candidates for texture coordinates; and storing a texture coordinate for the corner based on whether the corner is on the list.

36. The apparatus of claim 33, wherein encoding the texture coordinate comprises:

determining if the texture coordinate of the corner has changed resulting from the update; and storing a texture coordinate for the corner based on whether the texture coordinate has changed.

37. The apparatus of claim 26, wherein the circuitry comprises at least one of programmable logic, logic gates, a processor, and a memory.

38. An apparatus to encode an update of a polygon mesh having at least one target vertex, the apparatus comprising circuitry to:

define a local index of a vertex that neighbors the target vertex, the local index defining a position of the vertex relative to the target vertex;

store a global index of the target vertex, the global index defining the position of the vertex relative to a pre-defined array;

store a number of new faces resulting from the update;

store an identity of a face of the mesh using the local index; and store a movement status of a corner of a polygon adjacent to the target vertex.

39. The apparatus of claim 38, wherein the circuitry encodes a texture coordinate for a corner of a polygon affected by the update.

40. The apparatus of claim 39, wherein encoding of the texture coordinate is performed based on a location of the corner relative to the target vertex.

41. The apparatus of claim 38, wherein the circuitry comprises at least one of programmable logic, logic gates, a processor, and a memory.

* * * * *